(12) United States Patent
Wang et al.

(10) Patent No.: US 11,949,092 B2
(45) Date of Patent: Apr. 2, 2024

(54) ALL SOLID-STATE SODIUM-SULFUR OR LITHIUM-SULFUR BATTERY PREPARED USING CAST-ANNEALING METHOD

(71) Applicant: University of Maryland, College Park, College Park, MD (US)

(72) Inventors: Chunsheng Wang, Silver Spring, MD (US); Xiulin Fan, Greenbelt, MD (US); Jie Yue, Hyattsville, MD (US)

(73) Assignee: University of Maryland, College Park, College Park, MD (US)

( * ) Notice: Subject to any disclaimer, the term of this patent is extended or adjusted under 35 U.S.C. 154(b) by 723 days.

(21) Appl. No.: 16/981,469

(22) PCT Filed: Mar. 15, 2019

(86) PCT No.: PCT/US2019/022567
§ 371 (c)(1),
(2) Date: Sep. 16, 2020

(87) PCT Pub. No.: WO2019/178533
PCT Pub. Date: Sep. 19, 2019

(65) Prior Publication Data
US 2021/0028440 A1    Jan. 28, 2021

Related U.S. Application Data

(60) Provisional application No. 62/644,250, filed on Mar. 16, 2018.

(51) Int. Cl.
*H01M 4/133* (2010.01)
*H01M 4/04* (2006.01)
(Continued)

(52) U.S. Cl.
CPC ......... *H01M 4/133* (2013.01); *H01M 4/0471* (2013.01); *H01M 4/136* (2013.01);
(Continued)

(58) Field of Classification Search
None
See application file for complete search history.

(56) References Cited

U.S. PATENT DOCUMENTS

2011/0171537 A1* 7/2011 Takeuchi ............... C01B 17/22
                                                        252/182.1
2011/0200883 A1   8/2011 Cui et al.
(Continued)

FOREIGN PATENT DOCUMENTS

CN     102163720 A      8/2011
CN     108963230 A  * 12/2018  .......... H01M 10/054
(Continued)

OTHER PUBLICATIONS

Zhu et al., CN-108963230 Machine Translation (Year: 2018).*
(Continued)

*Primary Examiner* — Ula C Ruddock
*Assistant Examiner* — Anna Korovina
(74) *Attorney, Agent, or Firm* — Sterne, Kessler, Goldstein & Fox P.L.L.C.

(57) ABSTRACT

The present invention is directed to solid-state composite cathodes that comprise $Na_2S$ or $Li_2S$, $Na_3PS_4$, or $Li3PS4$, and mesoporous carbon. The present invention is also directed to methods of making the solid-state composite cathodes and methods of using the solid-state composite cathodes in batteries and other electrochemical technologies.

9 Claims, 33 Drawing Sheets

(51) Int. Cl.
   *H01M 4/136*     (2010.01)
   *H01M 4/1393*    (2010.01)
   *H01M 4/36*      (2006.01)
   *H01M 4/583*     (2010.01)
   *H01M 4/62*      (2006.01)
   *H01M 10/052*    (2010.01)
   *H01M 10/0562*   (2010.01)

(52) U.S. Cl.
   CPC ......... *H01M 4/1393* (2013.01); *H01M 4/364* (2013.01); *H01M 4/583* (2013.01); *H01M 4/625* (2013.01); *H01M 10/052* (2013.01); *H01M 10/0562* (2013.01)

(56)                References Cited

U.S. PATENT DOCUMENTS

| | | | |
|---|---|---|---|
| 2014/0045072 A1* | 2/2014 | Neumann | H01M 4/587 264/29.5 |
| 2014/0170503 A1* | 6/2014 | Yushin | H01M 10/0525 429/233 |
| 2016/0351964 A1* | 12/2016 | Jeong | H01M 4/62 |
| 2019/0051890 A1* | 2/2019 | Nose | H01M 4/364 |

FOREIGN PATENT DOCUMENTS

| | | | | |
|---|---|---|---|---|
| CN | 111653753 A | * | 9/2020 | ......... H01M 10/052 |
| EP | 2983231 A1 | | 2/2016 | |

OTHER PUBLICATIONS

Xu et al., CN-111653753 Machine Translation (Year: 2020).*
Fan et al., High-Performance All-Solid-State Na—S Battery Enabled by Casting-Annealing Technology, ACS Nano 2018, 12, 3360-3368, DOI: 10.1021/acsnano.7b08856 (Year: 2018).*
Zheng et al., In Situ Formed Lithium Sulfide/Microporous Carbon Cathodes for Lithium-Ion Batteries, ACS Nano, vol. 7, No. 12, 10995, 2013 (Year: 2013).*
ACS Material LLC, "Safety Data Sheet—Ordered Mesoporous Carbon CMK-3," accessed at URL:[https://www.acsmaterial.com/pub/media/catalog/product/s/d/sds-ordered_mesoporous_carbon_cmk-3.pdf] on Jan. 5, 2022, 8 pages, American Chemical Society, United States (Apr. 2017).
International Search Report and Written Opinion for International Application No. PCT/US2019/022567, ISA/US, Commissioner for Patents, Alexandria, Virginia, dated Jul. 22, 2019, 10 pages.
Jeong, T. G., et al., "Enhanced performance of sulfur-infiltrated bimodal mesoporous carbon foam by chemical solution deposition as cathode materials for lithium sulfur batteries," Scientific Reports 7:42238, Nature Publishing Group, United Kingdom (Feb. 2017).
Yue, J., et al., "High-Performance All-Inorganic Solid-State Sodium-Sulfur Battery," *ACS Nano* 11(5):4885-4891, American Chemical Society, United States (May 2017).

* cited by examiner

ALL SOLID-STATE SODIUM-SULFUR OR LITHIUM-SULFUR BATTERY PREPARED USING CAST-ANNEALING METHOD

BACKGROUND OF THE INVENTION

Field of the Invention

The present invention is directed to solid-state composite cathodes that comprise $Na_2S$ or $Li_2S$, $Na_3PS_4$ or $Li_3PS_4$, and ordered mesoporous carbon. The present invention is also directed to methods of making the solid-state composite cathodes and methods of using the solid-state composite cathodes in batteries and other electrochemical technologies.

BACKGROUND OF THE INVENTION

Room temperature all solid-state sodium-sulfur batteries (ASSBs) using sulfide solid electrolytes are a promising next-generation battery technology due to the high energy, enhanced safety, and earth abundant resources of both sodium and sulfur. Currently, the sulfide electrolyte ASSBs are fabricated using a cold-pressing process providing solid electrolytes with high residential stress. Even worse, the large volume change of $S/Na_2S$ during charge/discharge cycles induces additional stress, seriously weakening the less-contacted interfaces among the solid electrolyte, active materials, and the electron conductive agent that are formed in the cold-pressing process. The high and continuous increase of the interface resistance hinders the practical application of these solid electrolytes.

As the environmental crisis is becoming more and more serious due to the rapid consumption of fossil fuels, the need to obtain energy from renewable sources like wind, tide, and solar, is escalating. Efficient large-scale energy storage technologies are urgently needed for these renewable energies. Although lithium ion batteries (LIBs) have been successfully adopted to the field of the portable electronic devices, the limited and localized natural abundance of Li and the safety issues associated with using Li make commercial LIBs impractical for grid-scale energy storage.

For grid-scale energy storage applications, batteries should meet several critical requirements, in which safety, high energy density, natural abundance, and low cost of materials are the most important. Sodium-sulfur (Na—S) batteries using sulfur or $Na_2S$ as the cathode and using sodium or low potential alloys as the anode are one of the most promising devices for grid-scale energy storage due to the high energy density, inexpensive materials, and readily available resources. High temperature (>300° C.) Na—S batteries have been adopted for large-scale energy storage, where an operating temperature of >300° C. is required to: (1) lower the interface resistance by keeping the sodium anode and sulfur cathode in a liquid state; and (2) increase the $Na^+$ ion conductivity of the solid electrolyte (e.g., $NaAl_{11}O_{17}$). During operation, all of the active materials have to be in the molten state, therefore only $Na_2S_x$ ($x \geq 3$) species with the melting points <300° C. can be generated during the sodiation (discharge) process, limiting the energy density realized to one-third (~760 Wh/kg) of the theoretical energy density released. And, the molten state of the electrodes will dramatically increase the reactivity at high temperatures; thus, creating serious safety issues because any fracture of the brittle solid-state electrolyte will induce a fire or even an explosion at this temperature. Therefore, the high operational cost, safety concerns, and maintenance issues limit the widespread application of high temperature Na—S batteries.

Inspired by the success of room-temperature Li—S batteries, intensive investigations have been conducted to develop low temperature Na—S batteries using liquid organic-based electrolytes, polymer electrolytes, or liquid-solid hybrid electrolytes. During the charge/discharge cycles of liquid electrolyte batteries, the fluid electrolyte can penetrate into the pores of the electrodes to guarantee the ion conductive pathways, and flow backward/forward from the porous electrode to meet the volumetric change of the materials during charge and discharge cycles. High temperature Na—S batteries also possess these properties. The intimate contact between the liquid electrolyte and the electrode materials, and high capability to accommodate the volumetric change of the electrode materials in the liquid electrolyte Na—S battery enhance the ionic conductivity, charge transfer, and cycle life. However, similar to Li—S batteries, liquid electrolyte Na—S batteries also suffer the shuttle reactions, and the safety issues due to the flammability of the electrolyte and the formation of sodium dendrites in cycling limit the application for the large-scale energy storage. The ultimate solution of the safety issue for Na—S battery lies in the development of a low-temperature ASSB, in which the inorganic solid electrolyte is intrinsically nonflammable. Despite the great promises, the performance of ASSBs still suffers from a huge electrode/electrolyte interfacial resistance. Different from the interfacial contact between solid and liquid in the room-temperature liquid electrolyte or high-temperature liquid electrode Na—S cells, the contact between the all-solid electrolyte and the solid electrodes is point-to-point due to the nature of non-fluidity and rigidity for the solid electrodes and the electrolyte, thereby the interfacial resistance experiences an exponential increase during charge/discharge cycles. Any cracks formed due to the volume change during sodiation and desodiation will make the acive material detach from the solid electrolyte and/or electron conducting agent, leading to the fast deterioration of the electrochemical reversibility. Therefore, only limited success with poor cycling performance was reported using ASSBs. Recently, it was shown by Yue, J., et al., *ACS Nano* 11(5):4885-4891 (2017) that reversibility of the ASSB can be enhanced by decreasing the particle size of $Na_2S$ into nanometers by ball milling. However, it was shown that the high residential stress and poor interface contact induced by cold-pressing limited their cycling stability. And, the reversible capacity quickly dropped to ~50% of the initial reversible capacity after only 50 cycles.

The cast-annealing process is a mature method for fabricating structural materials with high mechanical and physical properties. This method possesses several merits: (1) the tension/stress will be eliminated during the precipitation process of heat treatment; (2) the precipitates from the matrix are thermodynamically stable; and (3) in situ precipitated phases with partically coherent with the parent materials reduce the interface resistance and enhance the mechanical property. Therefore the structural materials synthesized by this method have been extensively adopted in automotive and aerospace industries because of their ideal castability, good corrosion resistance, and improved mechanical properties in severe working conditions.

There is a need to reduce the interface resistance and eliminate the residential stress in $Na_2S$ and $Li_2S$ cathodes by fabricating sodium and lithium nanocomposites using a melting-casting process followed by a stress-release annealing-precipitation process. Thus, there is a need for improved cathodes for use with Na and Li metal batteries.

BRIEF SUMMARY OF THE INVENTION

The present invention describes a composition comprising:
(a) an ordered mesoporous carbon, wherein the ordered mesoporous carbon comprises channels;
(b) $A_3PS_4$, wherein A is $Na^+$ or $Li^+$; and
(c) $X_2S$, wherein X is $Na^+$ or $Li^+$.

In some embodiments, at least 30% of the channels in the ordered mesoporous carbon comprise $X_2S$.

In some embodiments, at least 70% of the channels in the ordered mesoporous carbon comprise $X_2S$.

In some embodiments, at least 90% of the channels in the ordered mesoporous carbon comprise $X_2S$.

In some embodiments, the channels in the ordered mesoporous carbon further comprise $A_3PS_4$.

In some embodiments, the weight ratio of $X_2S$ to $A_3PS_4$ in the composition is between about 1:2 to about 2:1.

In some embodiments, the weight ratio of $X_2S$ to $A_3PS_4$ in the composition is about 3:4.

In some embodiments, the weight ratio of $X_2S$ to ordered mesoporous carbon in the composition is between about 3:1 to about 1:1.

In some embodiments, the weight ratio of $X_2S$ to ordered mesoporous carbon in the composition is about 1:1.

In some embodiments, the ordered mesoporous carbon is selected from the group comprising CMK-1, CMK-2, CMK-3, CMK-5, and CMK-8.

In some embodiments, the ordered mesoporous carbon is CMK-3.

In some embodiments, X is $Na^+$ and is A is $Na^+$.

In some embodiments, X is $Li^+$ and A is $Li^+$.

The present disclosure describes an electrochemical cell comprising the compositions described herein.

The present disclosure describes a method of preparing a composite cathode comprising:
(a) admixing $X_2S$, $P_2S_5$, and an ordered mesoporous carbon, wherein X is $Na^+$ or $Li^+$;
(b) raising the temperature of the admixture to between about 600° C. and about 1000° C.;
(c) lowering the temperature of the admixture in (b); and
(d) raising the temperature of the admixture in (c) to between about 100° C. and about 400° C.

In some embodiments, the method further comprises:
(e) lowering the temperature of the admixture in (d).

In some embodiments, the admixture in (a) is milled.

In some embodiments, the admixture in (a) is hand milled.

In some embodiments, the weight ratio of $X_2S$ to $P_2S_5$ is between about 16:1 to about 1:1.

In some embodiments, the weight ratio of $X_2S$ to $P_2S_5$ is between about 4:1 to about 2:1.

In some embodiments, the weight ratio of $X_2S$ to ordered mesoporous carbon is between about 16:1 to about 1:1.

In some embodiments, the weight ratio of $X_2S$ to ordered mesoporous carbon is between about 3:1 to about 1:1.

In some embodiments, the admixing in (a) is at a temperature between about 10° C. and about 40° C.

In some embodiments, X is $Na^+$.

In some embodiments, X is $Li^+$.

In some embodiments, the ordered mesoporous carbon is selected from the group consisting of CMK-1, CMK-2, CMK-3, CMK-5, and CMK-8.

In some embodiments, the ordered mesoporous carbon is CMK-3.

In some embodiments, the temperature in (b) is raised to between about 800° C. and about 900° C.

In some embodiments, the time to raise the temperature in (b) is between about 2 hours and about 10 hours.

In some embodiments, the raised temperature in (b) is maintained for between about 10 minutes and about 10 hours.

In some embodiments, the temperature in (c) is lowered to between about −20° C. and about 20° C.

In some embodiments, the temperature in (c) is lowered to between about −10° C. and about 10° C.

In some embodiments, the time to lower the temperature in (c) is between about 1 second and about 1 hour.

In some embodiments, the lowered temperature in (c) is maintained for between about 1 minute and about 10 hours.

In some embodiments, the temperature in (d) is raised to between about 200° C. and about 300° C.

In some embodiments, the time to raise the temperature in (d) is between about 2 minutes and about 24 hours.

In some embodiments, the temperature in (e) is lowered to between about −20° C. and about 50° C.

In some embodiments, the temperature in (e) is lowered to between about 20° C. and about 30° C.

The present disclosure also describes a composite cathode prepared by the method described herein.

The present disclosure describes a solid state battery comprising:
(a) a cathode active material layer comprising the composition described herein;
(b) an anode active material layer; and
(c) a solid state electrolyte material.

In some embodiments, the anode active material layer comprises $Na_{15}Sn_4$-AB.

In some embodiments, the solid state electrolyte material comprises $Na_3PS_4$.

In some embodiments, the solid state battery provides a voltage of between about 0.5 V and about 4 V when measured at 60° C.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention. The following drawings are given by way of illustration only, and thus are not intended to limit the scope of the present invention.

DETAILED DESCRIPTION OF THE INVENTION

Figure 1:
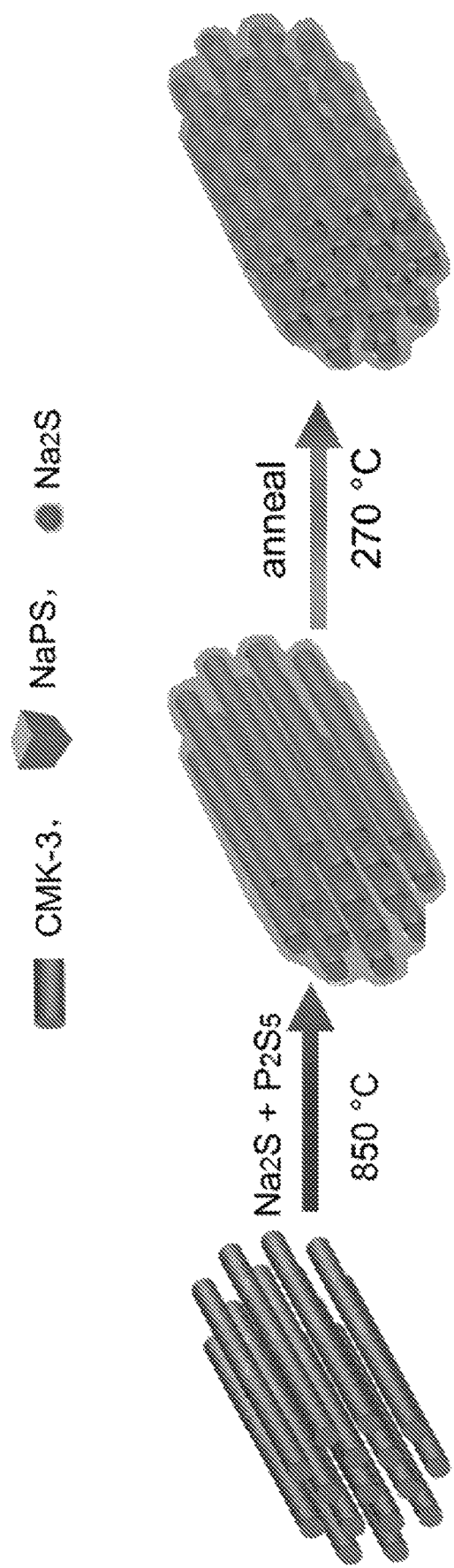
FIG. 1 is a schematic illustration of the synthesis of cast-annealed $Na_2S$—$Na_3PS_4$-CMK-3 composite.

As used herein, the singular terms "a" and "the" are synonymous and used interchangeably with "one or more" and "at least one," unless the language and/or context clearly indicates otherwise. As used herein, the term "comprising" means including, made up of, and composed of.

All numbers in this description indicating amounts, ratios of materials, physical properties of materials, and/or use are to be understood as modified by the word "about," except as otherwise explicitly indicated. The term "about" as used herein includes the recited number ±10%. Thus, "about ten" means 9 to 11.

The present disclosure provides a method for preparing $Na_2S$—$Na_3PS_4$-CMK-3 composites using a melting-casting process followed by a stress-release annealing-precipitation process which reduces the interface resistance and eliminates the residential stress in $Na_2S$ cathodes. The casting-annealing process guarantees close contact between the $Na_3PS_4$ solid electrolyte and the CMK-3 mesoporous carbon in a mixed ionic/electronic conductive matrix, while the in situ precipitated $Na_2S$ active species generated from the solid electrolyte during the annealing process guarantees the interfacial contact among these three sub-components without residential stress, which greatly reduces the interfacial resistance, and enhances the electrochemical performance. The in situ synthesized $Na_2S$—$Na_3PS_4$-CMK-3 composite delivers a stable and highly reversible capacity of 810 mAh/g at 50 mA/g for 50 cycles at 60° C.

Synthesis of the Composite Cathode

The present invention describes a method of preparing a composite cathode comprising:
 (a) admixing $X_2S$, $P_2S_5$, and an ordered mesoporous carbon, wherein X is $Na^+$ or $Li^+$;
 (b) raising the temperature of the admixture to between about 600° C. and about 1000° C.;
 (c) lowering the temperature of the admixture in (b); and
 (d) raising the temperature of the admixture in (c) to between about 100° C. and about 400° C.

In some embodiments, the composite cathode is generated in situ.

In some embodiments, the admixture in (a) is milled. As used herein, milling refers to breaking solid materials into smaller pieces by grinding, crushing, or cutting. In some embodiments, the admixture in (a) is milled using a milling machine. In some embodiments, the admixture in (a) is ball milled. As used herein, ball milling refers to a hollow cylindrical shell filled with balls rotating about its axis, wherein the balls act as the grinding media. In some embodiments, the admixture is milled by hand. In some embodiments, the admixture is hand milled with a mortar and pestle.

In some embodiments, the weight ratio of $X_2S$ to $P_2S_5$ is between about 16:1 to about 1:1, about 16:1 to about 2:1, about 16:1 to about 3:1, about 16:1 to about 4:1, about 16:1 to about 8:1, about 16:1 to about 12:1, about 12:1 to about 1:1, about 12:1 to about 2:1, about 12:1 to about 3:1, about 12:1 to about 4:1, about 12:1 to about 8:1, about 8:1 to about 1:1, about 8:1 to about 2:1, about 8:1 to about 3:1, about 8:1 to about 4:1, about 4:1 to about 1:1, about 4:1 to about 2:1, about 4:1 to about 3:1, about 3:1 to about 1:1, about 3:1 to about 2:1, or about 2:1 to about 1:1. In some embodiments, the weight ratio of $X_2S$ to $P_2S_5$ is between about 4:1 to about 2:1.

In some embodiments, the weight ratio of $Na_2S$ to $P_2S_5$ is between about 16:1 to about 1:1, about 16:1 to about 2:1, about 16:1 to about 3:1, about 16:1 to about 4:1, about 16:1 to about 8:1, about 16:1 to about 12:1, about 12:1 to about 1:1, about 12:1 to about 2:1, about 12:1 to about 3:1, about 12:1 to about 4:1, about 12:1 to about 8:1, about 8:1 to about 1:1, about 8:1 to about 2:1, about 8:1 to about 3:1, about 8:1 to about 4:1, about 4:1 to about 1:1, about 4:1 to about 2:1, about 4:1 to about 3:1, about 3:1 to about 1:1, about 3:1 to about 2:1, or about 2:1 to about 1:1. In some embodiments, the weight ratio of $Na_2S$ to $P_2S_5$ is between about 4:1 to about 2:1.

In some embodiments, the weight ratio of $X_2S$ to ordered mesoporous carbon is between about 16:1 to about 1:1, about 16:1 to about 2:1, about 16:1 to about 3:1, about 16:1 to about 4:1, about 16:1 to about 8:1, about 16:1 to about 12:1, about 12:1 to about 1:1, about 12:1 to about 2:1, about 12:1 to about 3:1, about 12:1 to about 4:1, about 12:1 to about 8:1, about 8:1 to about 1:1, about 8:1 to about 2:1, about 8:1 to about 3:1, about 8:1 to about 4:1, about 4:1 to about 1:1, about 4:1 to about 2:1, about 4:1 to about 3:1, about 3:1 to about 1:1, about 3:1 to about 2:1, or about 2:1 to about 1:1. In some embodiments, the weight ratio of $X_2S$ to ordered mesoporous carbon is between about 3:1 to about 1:1.

In some embodiments, the weight ratio of $Na_2S$ to ordered mesoporous carbon is between about 6:1 to about 1:1, about 6:1 to about 2:1, about 6:1 to about 3:1, about 6:1 to about 4:1, about 6:1 to about 5:1, about 5:1 to about 1:1, about 5:1 to about 2:1, about 5:1 to about 3:1, about 5:1 to about 4:1, about 4:1 to about 1:1, about 4:1 to about 2:1, about 4:1 to about 3:1, about 3:1 to about 1:1, about 3:1 to about 2:1, or about 2:1 to about 1:1. In some embodiments, the weight ratio of $Na_2S$ to ordered mesoporous carbon is between about 3:1 to about 1:1.

In some embodiments, the admixing is at a temperature between about 10° C. and about 40° C., about 10° C. and about 30° C., about 10° C. and about 20° C., about 20° C. and about 40° C., about 20° C. and about 30° C., or about 30° C. and about 40° C. In some embodiments, the admixing is at a temperature between about 20° C. and about 30° C.

Sodium Sulfur or Lithium Sulfur

In some embodiments, the method of preparing a composite cathode comprises admixing $X_2S$, $P_2S_5$, and an ordered mesoporous carbon, wherein X is $Na^+$ or $Li^+$. In some embodiments, $X_2S$ is $Na_2S$. In some embodiments, $X_2S$ is $Li_2S$.

Mesoporous Carbon

Mesoporous carbon is a hydrophobic material with highly specific surface area and pore density and possesses excellent electrical conductivity. Mesoporous carbon is available as a powder or as a nano-powder with varying pore sizes in the nanoscale range. In some embodiments, the mesoporous carbon has a pore diameter between about 2 nm and about 50 nm.

In some embodiments, the mesoporous carbon is an ordered mesoporous carbon. Ordered mesoporous carbon is a flexible material providing interconnected channels for the diffusion of electroactive species in electrochemical systems. In some embodiments, the ordered mesoporous carbon is a CMK-n (carbon mesostructured by KAIST), wherein 0<n<10. A CMK-n can be synthesized using mesoporous silicas or aluminosilicate templates, constructed with 3-D pore connectivity. In some embodiments, the ordered mesoporous carbon is a commercially available ordered mesoporous carbon.

In some embodiments, the ordered mesoporous carbon is selected from the group consisting of CMK-1, CMK-2, CMK-3, CMK-5, and CMK-8. In some embodiments, the ordered mesoporous carbon is CMK-3.

Casting of the Composite Material

In some embodiments, after admixing $X_2S$, $P_2S_5$, and an ordered mesoporous carbon, the admixture is heated at a temperature between about 600° C. and about 1000° C.

In some embodiments, after admixing $X_2S$, $P_2S_5$, and an ordered mesoporous carbon, the temperature is raised to between about 700° C. and about 1000° C., about 700° C. and about 900° C., about 700° C. and about 850° C., about 700° C. and about 800° C., about 700° C. and about 750° C., about 750° C. and about 1000° C., about 750° C. and about 900° C., about 750° C. and about 850° C., about 750° C. and about 800° C., about 800° C. and about 1000° C., about 800° C. and about 900° C., about 800° C. and about 850° C., about 850° C. and about 1000° C., about 850° C. and about 900° C., or about 900° C. and about 1000° C. In some embodiments, after admixing $X_2S$, $P_2S_5$, and an ordered mesoporous carbon, the temperature is raised to between about 800° C. and about 900° C.

In some embodiments, after admixing $X_2S$, $P_2S_5$, and an ordered mesoporous carbon, the time to raise the temperature is between about 2 hours and about 10 hours, about 2 hours and about 8 hours, about 2 hours and about 6 hours, about 2 hours and about 4 hours, about 4 hours and about 10 hours, about 4 hours and about 8 hours, about 4 hours and about 6 hours, about 6 hours and about 10 hours, about 6 hours and about 8 hours, or about 8 hours and about 10 hours. In some embodiments, after admixing $X_2S$, $P_2S_5$, and an ordered mesoporous carbon, the time to raise the temperature is between about 6 hours and about 8 hours.

In some embodiments, the raised temperature is maintained for between 10 minutes and about 10 hours, about 10 minutes and about 5 hours, about 10 minutes and about 2 hours, about 10 minutes and about 1 hour, about 10 minutes and about 30 minutes, about 30 minutes and about 10 hours, about 30 minutes and about 5 hours, about 30 minutes and about 2 hours, about 30 minutes and about 1 hour, about 1 hour and about 10 hours, about 1 hour and about 5 hours, about 1 hour and about 2 hours, about 2 hours and about 10 hours, about 2 hours and about 5 hours, or about 5 hours and about 10 hours. In some embodiments, the raised temperature is maintained for between 30 minutes and about 2 hours.

In some embodiments, after admixing $X_2S$, $P_2S_5$, and an ordered mesoporous carbon, the temperature is raised to between about 800° C. and about 900° C. over a period of between about 6 hours and 8 hours.

In some embodiments, after raising the temperature of the admixture in (b), the temperature is lowered to a temperature between about −20° C. and about 20° C., about −20° C. and about 10° C., about −20° C. and about 0° C., about −20° C. and about −10° C., about −10° C. and about 20° C., about −10° C. and about 10° C., about −10° C. and about 0° C., about 0° C. and about 20° C., about 0° C. and about 10° C., or about 10° C. and about 20° C. In some embodiments, after raising the temperature of the admixture in (b), the temperature is lowered to a temperature between about −10° C. and about 10° C.

In some embodiments, the temperature of the mixture is lowered in (c) for between about 1 second and about 1 hour, about 1 second and about 30 minutes, about 1 second and about 10 minutes, about 1 second and about 1 minute, about 1 second and about 30 seconds, about 1 second and about 10 seconds, about 10 seconds and about 1 hour, about 10 seconds and about 30 minutes, about 10 seconds and about 10 minutes, about 30 seconds and about 1 hour, about 30 seconds and about 30 minutes, about 30 seconds and about 10 minutes, about 30 seconds and about 1 minute, about 1 minute and about 1 hour, about 1 minute and about 30 minutes, about 1 minute and about 10 minutes, about 10 minutes and about 1 hour, about 10 minutes and about 30 minutes, or about 30 minutes and about 1 hour. In some embodiments, the temperature of the mixture is lowered in (c) for between about 1 second and about 30 seconds.

In some embodiments, the lowered temperature is maintained for between 1 minute and about 10 hours, about 1 minute and about 5 hours, about 1 minute and about 2 hours, about 1 minute and about 1 hour, about 1 minute and about 30 minutes, about 30 minutes and about 10 hours, about 30 minutes and about 5 hours, about 30 minutes and about 2 hours, about 30 minutes and about 1 hour, about 1 hour and about 10 hours, about 1 hour and about 5 hours, about 1 hour and about 2 hours, about 2 hours and about 10 hours, about 2 hours and about 5 hours, or about 5 hours and about 10 hours. In some embodiments, the raised temperature is maintained for between 30 minutes and about 2 hours.

In some embodiments, the casting process generates a solid electrolyte. In some embodiments, the solid electrolyte is a lithium-containing solid electrolyte or a sodium-containing solid electrolyte.

In some embodiments, the solid-state electrolyte is $X_3PS_4$, wherein X is $Na^+$ or $Li^+$. In some embodiments, the solid electrolyte is $Na_3PS_4$. In some embodiments, the solid electrolyte is $Li_3PS_4$.

Annealing of the Composite Material

In some embodiments, after cooling the admixture in (c), the admixture is heated at a temperature between about 100° C. and about 600° C.

In some embodiments, the temperature of the admixture in (d) is raised to between about 100° C. and about 600° C., 100° C. and about 400° C., about 100° C. and about 300° C., about 100° C. and about 250° C., about 100° C. and about 200° C., about 100° C. and about 150° C., about 150° C. and about 600° C., about 150° C. and about 400° C., about 150° C. and about 300° C., about 150° C. and about 250° C., about 150° C. and about 200° C., about 200° C. and about 600° C., about 200° C. and about 400° C., about 200° C. and about 300° C., about 200° C. and about 250° C., about 250° C. and about 600° C., about 250° C. and about 400° C., about 250° C. and about 300° C., about 300° C. and about 600° C., about 300° C. and about 400° C., or about 400° C. and about 600° C. In some embodiments, the temperature of the admixture in (d) is raised to between about 200° C. and about 300° C.

In some embodiments, the temperature of the admixture in (d) is raised for between about 2 minutes and about 24 hours, about 2 minutes and about 10 hours, about 2 minutes and about 5 hours, about 2 minutes and about 1 hour, about 2 minutes and about 30 minutes, about 30 minutes and about 24 hours, about 30 minutes and about 10 hours, about 30 minutes and about 5 hours, about 30 minutes and about 1 hour, about 1 hour and about 24 hours, about 1 hour and about 10 hours, about 1 hour and about 5 hours, about 5 hours and about 24 hours, about 5 hours and about 10 hours, or about 10 hours and about 24 hours. In some embodiments, the temperature of the admixture in (d) is raised for between about 1 hour and about 5 hours.

In some embodiments, the method further comprises:
(e) lowering the temperature of the admixture in (d).

In some embodiments, the temperature of the admixture in (d) is lowered to a temperature between about −20° C. and about 50° C., about −20° C. and about 30° C., about −20° C. and about 20° C., about −20° C. and about 0° C., about −20° C. and about −10° C., about −10° C. and about 50° C., about −10° C. and about 30° C., about −10° C. and about 20° C., about −10° C. and about 0° C., about 0° C. and about 50° C., about 0° C. and about 30° C., about 0° C. and about 20° C., about 20° C. and about 50° C., about 20° C. and about 30° C., or about 30° C. and about 50° C. In some embodiments, the temperature of the admixture in (d) is lowered to a temperature between about 20° C. and about 30° C.

In some embodiments, the method produces a $Na_2S$—$Na_3PS_4$-CMK-3 composite cathode. In some embodiments, the method produces a $Li_2S$—$Li_3PS_4$-CMK-3 composite cathode.

Composite Cathode

In some embodiments, the present invention describes a composition comprising:
 (a) an ordered mesoporous carbon;
 (b) $A_3PS_4$, wherein A is $Na^+$ or $Li^+$; and
 (c) $X_2S$, wherein X is $Na^+$ or $Li^+$.

In some embodiments, the present invention describes a composition comprising:
 (a) an ordered mesoporous carbon, wherein the ordered mesoporous carbon comprises channels;
 (b) $A_3PS_4$, wherein A is $Na^+$ or $Li^+$; and
 (c) $X_2S$, wherein X is $Na^+$ or $Li^+$;
wherein at least 30% of the channels in the ordered mesoporous carbon comprise $X_2S$.

In some embodiments, at least 30%, at least 50%, at least 70%, or at least 90% of the channels in the ordered mesoporous carbon comprise $X_2S$. In some embodiments, between about 30% and about 100%, about 30% and about 90%, about 30% and about 70%, about 30% and about 50%, about 50% and about 100%, about 50% and about 90%, about 50% and about 70%, about 70% and about 100%, about 70% and about 90%, or about 90% and about 100% of the channels in the ordered mesoporous carbon comprises $X_2S$. In some embodiments, the percentage of channels that are filled with $X_2S$ can be determined using energy dispersive spectroscopy (EDS).

In some embodiments, the present invention describes a composition comprising:
 (a) an ordered mesoporous carbon, wherein the ordered mesoporous carbon comprises channels;
 (b) $A_3PS_4$, wherein A is $Na^+$ or $Li^+$; and
 (c) $X_2S$, wherein X is $Na^+$ or $Li^+$;
wherein at least 30% of the channels in the ordered mesoporous carbon comprise $A_3PS_4$.

In some embodiments, at least 30%, at least 50%, at least 70%, or at least 90% of the channels in the ordered mesoporous carbon comprise $A_3PS_4$. In some embodiments, between about 30% and about 100%, about 30% and about 90%, about 30% and about 70%, about 30% and about 50%, about 50% and about 100%, about 50% and about 90%, about 50% and about 70%, about 70% and about 100%, about 70% and about 90%, or about 90% and about 100% of the channels in the ordered mesoporous carbon comprises $A_3PS_4$. In some embodiments, the percentage of channels that are filled with $A_3PS_4$. can be determined using energy dispersive spectroscopy (EDS).

In some embodiments, the present invention describes a composition comprising:
 (a) an ordered mesoporous carbon, wherein the ordered mesoporous carbon comprises channels;
 (b) $A_3PS_4$, wherein A is $Na^+$ or $Li^+$; and
 (c) $X_2S$, wherein X is $Na^+$ or $Li^+$; wherein at least 30% of the channels in the ordered mesoporous carbon comprise $X_2S$ and $A_3PS_4$.

In some embodiments, at least 30%, at least 50%, at least 70%, or at least 90% of the channels in the ordered mesoporous carbon comprise $X_2S$ and $A_3PS_4$. In some embodiments, between about 30% and about 100%, about 30% and about 90%, about 30% and about 70%, about 30% and about 50%, about 50% and about 100%, about 50% and about 90%, about 50% and about 70%, about 70% and about 100%, about 70% and about 90%, or about 90% and about 100% of the channels in the ordered mesoporous carbon comprises $X_2S$ and $A_3PS_4$. In some embodiments, the percentage of channels that comprise $X_2S$ and $A_3PS_4$ can be determined using energy dispersive spectroscopy (EDS).

In some embodiments, the weight ratio of $X_2S$ to $P_2S_5$ in the composite is between about 1:4 to about 4:1, about 1:4 to about 3:1, about 1:4 to about 2:1, about 1:4 to about 1:1, about 1:2 to about 4:1, about 1:2 to about 3:1, about 1:2 to about 2:1, about 1:2 to about 1:1, about 1:1 to about 4:1, about 1:1 to about 3:1, or about 1:1 to about 2:1. In some embodiments, the weight ratio of $X_2S$ to $P_2S_5$ in the composite is between about 1:2 to about 2:1.

In some embodiments, the weight ratio of $Na_2S$ to $P_2S_5$ in the composite is between about 1:4 to about 4:1, about 1:4 to about 3:1, about 1:4 to about 2:1, about 1:4 to about 1:1, about 1:2 to about 4:1, about 1:2 to about 3:1, about 1:2 to about 2:1, about 1:2 to about 1:1, about 1:1 to about 4:1, about 1:1 to about 3:1, or about 1:1 to about 2:1. In some embodiments, the weight ratio of $Na_2S$ to $P_2S_5$ in the composite is between about 1:2 to about 2:1.

In some embodiments, the weight ratio of $X_2S$ to ordered mesoporous carbon is between about 16:1 to about 1:1, about 16:1 to about 2:1, about 16:1 to about 3:1, about 16:1 to about 4:1, about 16:1 to about 8:1, about 16:1 to about 12:1, about 12:1 to about 1:1, about 12:1 to about 2:1, about 12:1 to about 3:1, about 12:1 to about 4:1, about 12:1 to about 8:1, about 8:1 to about 1:1, about 8:1 to about 2:1, about 8:1 to about 3:1, about 8:1 to about 4:1, about 4:1 to about 1:1, about 4:1 to about 2:1, about 4:1 to about 3:1, about 3:1 to about 1:1, about 3:1 to about 2:1, or about 2:1 to about 1:1. In some embodiments, the weight ratio of $X_2S$ to ordered mesoporous carbon is between about 3:1 to about 1:1.

In some embodiments, the weight ratio of $Na_2S$ to ordered mesoporous carbon is between about 6:1 to about 1:1, about 6:1 to about 2:1, about 6:1 to about 3:1, about 6:1 to about 4:1, about 6:1 to about 5:1, about 5:1 to about 1:1, about 5:1 to about 2:1, about 5:1 to about 3:1, about 5:1 to about 4:1, about 4:1 to about 1:1, about 4:1 to about 2:1, about 4:1 to about 3:1, about 3:1 to about 1:1, about 3:1 to about 2:1, or about 2:1 to about 1:1. In some embodiments, the weight ratio of $Na_2S$ to ordered mesoporous carbon is between about 3:1 to about 1:1.

Solid State Battery

In some embodiments, the composite cathode is used to produce a solid state battery. In some embodiments, the solid state battery comprises a cathode active material layer, an anode active material layer, and a solid state electrolyte material formed between the cathode composite layer and the anode active material layer.

Examples of the solid state battery of the present invention include a lithium solid state battery and a sodium solid state battery. The solid state battery of the present invention can be either a primary battery or a secondary battery. In some embodiments, the solid state battery is a secondary battery. A secondary battery can be repeatedly charged and discharged, and is useful as, for example, an in-vehicle battery. Examples of the shape of the solid state battery include, for example, a coin type, a laminated type, a cylindrical type, or a rectangular type. The method for producing the solid state battery is not limited and can be produced using methods known to one of ordinary skill in the art.

Cathode Active Material Layer

The cathode active material layer is a layer containing at least a cathode composite, and can further comprise a conductive material, a binder, or combinations thereof. In some embodiments, the cathode active material layer is a $Na_2S$—$Na_3PS_4$-CMK-3 composite cathode. In some embodiments, the cathode active material is a $Li_2S$—$Li_3PS_4$-CMK-3 composite cathode.

Anode Active Material Layer

The anode active material layer is a layer containing at least an anode active material and can further comprise a conductive material, a binder, and combinations thereof. The type of the anode active material is not particularly limited, and examples of the anode active material include a carbon active material, an oxide active material, and a metal active material. Examples of the carbon active material include mesocarbon microbeads (MCMB), highly-oriented graphite (HOPG), hard carbon, and soft carbon. Examples of the oxide active material include $Nb_2O_5$, $Li_4Ti_5O_{12}$, and SiO. Examples of the metal active material include In, Al, Si, and Sn. In some embodiments, the anode active material is Sn. In some embodiments, the anode active material is a Na—Sn alloy. In some embodiments, the anode active material is $Na_{15}Sn_4$-AB (AB is acetylene black).

Solid State Electrolyte

The solid state electrolyte is not particularly limited as long as the solid state electrolyte has ion conductivity. In some embodiments, the solid state electrolyte (SSE) is a lithium-containing SSE or a sodium-containing SSE.

In some embodiments, the SSE is a sodium-containing SSE. In some embodiments, the sodium-containing SSE is $Na_{1+x}Zr_2Si_xP_{3-x}O_{12}$ (NASICON), wherein 0≤x≤3). In some embodiments, the sodium-containing SSE is sodium β-alumina. In some embodiments, the SSE is $Na_3PS_4$.

In some embodiments, the SSE is a lithium-containing SSE. In some embodiments, the lithium-containing SSE has the formula $Li_{2+2x}Zn_{1-x}GeO_4$ (LISICON), wherein 0≤x≤0.5. In some embodiments, the SSE is $Li_3PS_4$.

In some embodiments, the SSE is a lithium-containing SSE with a garnet structure.

Garnet structures have a general chemical formula of $A_3B_2(XO_4)_3$, where A, B, and X are eight, six, and four oxygen-coordinated sites, respectively. High Li-containing garnet structures contain more than three lithium per formula (e.g., $Li_7La_3Zr_2O_{12}$ and $Li_5La_3Ta_2O_{12}$) and most commonly crystallize in face centered cubic structures (space group Ia3d) but tetragonal polymorphs are also known. Early work with garnet lithium ionic conductors focused on compositions of $Li_5La_3M_2O_{12}$ (M=Ta, Nb) and doped compositions of $Li_6ALa_2M_2O_{12}$ (A=Ca, Sr, Ba; M=Ta, Nb). The highest conductivity for these compositions was around $10^{-5}$ S/cm at room temperature, which was not sufficiently high to use in a battery application. In 2007, the cubic garnet $Li_7La_3Zr_2O_{12}$ (LLZO) was successfully synthesized by Murugan, R., et al., *Angew. Chem.* 119:7925 (2007) and was shown to have a lithium ionic conductivity of about $10^{-4}$ S/cm at room temperature. LLZO is a promising solid electrolyte as it is highly conductive, yet appears to be stable against reduction by lithium metal, even when in direct contact with molten or evaporated lithium. (See Awaka, J., et al., *J. Solid State Chem.* 182:2360 (2009)). Two polymorphs of LLZO have been reported with the cubic phase having an ionic conductivity two orders of magnitude higher than that of the tetragonal phase. LLZO suffers from several problems including the difficulty of processing the materials due to the requirement of a temperature as high as 1230° C. for densification and the surface chemical instability during air exposure.

In some embodiments, the lithium-containing SSE with a garnet structure comprises $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_{6.7}BaLa_2Nb_{1.75}Zn_{0.25}O_{12}$, $Li_{6.75}BaLa_2Ta_{1.75}Zn_{0.25}O_{12}$, or $Li_{6.75}La_{2.75}Ca_{0.25}Zr_{1.75}Nb_{0.25}O_{12}$. In some embodiments, the solid state electrolyte is $Li_{6.75}La_{2.75}Ca_{0.25}Zr_{1.75}Nb_{0.25}O_{12}$.

Other Components

The solid state battery may further include a cathode current collector that collects current from the cathode composite material and an anode current collector that collects current from the anode active material layer. Examples of a material of the cathode current collector include SUS, aluminum, nickel, iron, titanium, and carbon. Examples of a material of the anode current collector include SUS, copper, nickel, and carbon. Further, for a battery case used in the present invention, one commonly used for solid state batteries may be used. An example of such a battery case includes a SUS battery case.

Properties of the Solid State Battery

Several important properties of rechargeable batteries include energy density, power density, capacity, particularly reversible capacity, rate capability, cycle life, thermal stability, cost, and safety. All of these properties are influenced by the choice of materials used to form the battery. The capacity of a battery is the amount of electronic charge that is transported at a constant current between the electrodes per unit weigh in the time $A_t$ for a complete discharge, and the energy density is the product of the average voltage during discharge and the capacity. Both decrease with increasing current and, therefore, power delivered. Moreover, the cycle life of a rechargeable battery is defined as the number of charge/discharge cycles before the capacity fades to 80% of its original capacity. Capacity fade is caused by a loss of the reversibility of the chemical reaction between the electrodes.

In some embodiments, battery performance can be quantified with four parameters: cell voltage, capacity, Coulombic efficiency, and cycling stability. While the first two determine the energy density, the latter two dictate the life and energy efficiency.

The "energy density" of a battery is the nominal battery energy per unit mass (Wh/kg). The energy density is the ability of a battery to store energy, i.e., a high energy density can store a lot of energy compared to a low energy density battery.

The "cycle life" of a battery is the number of complete charge/discharge cycles that the battery is able to support before its capacity falls under 80% of its original capacity. The "C-rate" of a battery is a measure of the rate at which a battery is being discharged. A C-rate of 1 C is a one-hour discharge, a C-rate of 0.5 C is a two-hour discharge, and a C-rate of 0.2 C is a five-hour discharge.

In some embodiments, the number of cycles for the battery at a high C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 2.5 C is between about 10 and about 500.

The "capacity retention" of a battery is a measurement of the fraction of full capacity available from a battery under a specified set of conditions, after the battery has been stored for a given amount of time.

In some embodiments, the capacity decay rate (in mAh/g) for a battery at a high C-rate of about 2.5 C is between about 0.005% and about 0.1%, about 0.005% and about 0.05%, 0.005% and about 0.01%, about 0.01% and about 0.1%, about 0.01% and about 0.05%, or about 0.05% and about 0.01% per cycle. In some embodiments, the capacity decay rate (in mAh/g) for a battery at a high C-rate of about 2.5 C is between about 0.05% and about 0.01% per cycle.

In some embodiments, the capacity retention (in mAh/g) for a battery at a low C-rate of about 0.5 C is between about 30% and about 100%, about 30% and about 90%, about 30% and about 80%, about 30% and about 70%, about 30% and about 60%, about 60% and about 100%, about 60% and about 90%, about 60% and about 80%, about 60% and about 70%, about 70% and about 100%, about 70% and about 90%, about 70% and about 80%, about 80% and about 100%, about 80% and about 90%, or about 90% and about 100%. In some embodiments, the capacity retention (in mAh/g) for a battery at a low C-rate of about 0.5 C is between about 90% and about 100%.

In some embodiments, the number of cycles for the battery at a high C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 2.5 C is between about 500 and about 2000.

In some embodiments, the electrochemical cell operates at a temperature of less than about 100° C., about 90° C., about 80° C., about 70° C., about 60° C., about 50° C., about 40° C., about 30° C., about 20° C., or about 10° C. In some embodiments, the electrochemical cell operates at a temperature between about −40° C. and about 100° C., about −40° C. and about 90° C., about −40° C. and about 80° C., about −40° C. and about 70° C., about −40° C. and about 60° C., about −40° C. and about 50° C., about −40° C. and about 40° C., about −40° C. and about 30° C., about −30° C. and about 100° C., about −30° C. and about 90° C., about −30° C. and about 80° C., about −30° C. and about 70° C., about −30° C. and about 60° C., about −30° C. and about 50° C., about −30° C. and about 40° C., about −30° C. and about 30° C., about −20° C. and about 100° C., about −20° C. and about 90° C., about −20° C. and about 80° C., about −20° C. and about 70° C., about −20° C. and about 60° C., about −20° C. and about 50° C., about −20° C. and about 40° C., or about −20° C. and about 30° C.

In some embodiments, the electrochemical cell has a fuel cell output voltage greater than 1 V. In some embodiments, the electrochemical cell has a fuel cell output voltage greater than 1.5 V. In some embodiments, the electrochemical cell has a fuel cell output voltage between 1 V and 3 V, 1 V and 2.5 V, 1 V and 2 V, 1 V and 1.5 V, 1.5 V and 3 V, 1.5 V and 2.5 V, 1.5 V and 2 V, 2 V and 3 V, 2 V and 2.5 V, or 2.5 V and 3 V. In some embodiments, the electrochemical cell has a fuel cell output voltage between 1 V and 2 V.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Synthesis of $Na_2S$—$Na_3PS_4$-CMK-3 Composite $Na_2S$ and $P_2S_5$ (99%) powders were purchased from Sigma-Aldrich (St. Louis, MO). CMK-3 mesoporous carbon was purchased from ACS Material, LLC (Pasadena, CA). $Na_3PS_4$ solid electrolyte was synthesized by ball milling followed by an annealing process. The cast-annealed $Na_2S$—$Na_3PS_4$-CMK-3 composite was synthesized by a casting-annealing method.

Figure 2:
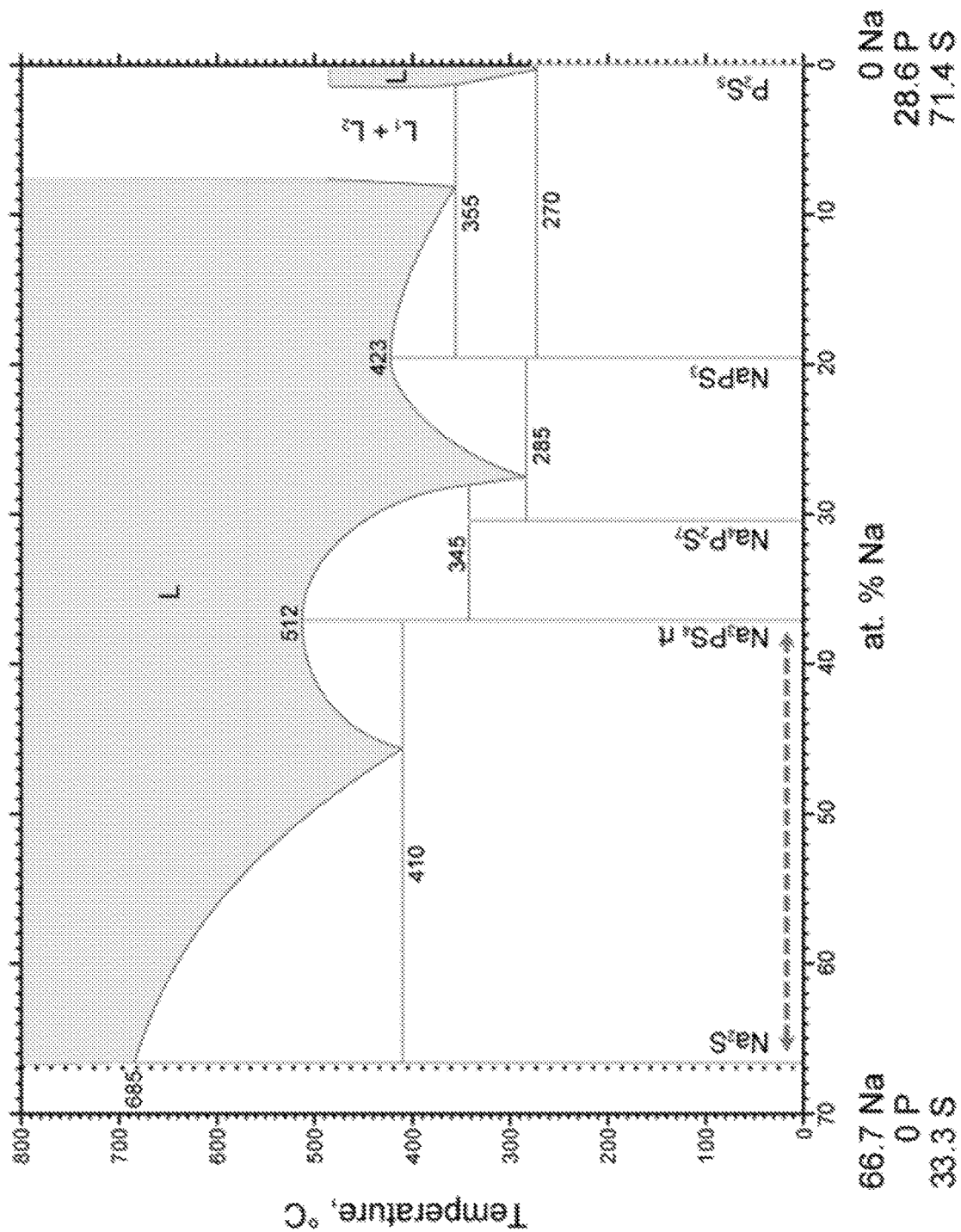
FIG. 2 is a phase diagram for a $Na_2S$ and $P_2S_5$ melt.

A schematic illustration of the synthesis of cast-annealed $Na_2S$—$Na_3PS_4$-CMK-3 composite cathode is shown in FIG. 1. The starting materials $Na_2S$, $P_2S_5$, and CMK-3 mesoporous carbon were hand milled with a mortar and pestle in the glovebox. The weight ratio of $Na_2S$:$P_2S_5$:CMK-3 was set as 50.5:19.5:30 to make sure the weight ratio of $Na_2S$, $Na_3PS_4$, and CMK-3 mesoporous carbon in the final $Na_2S$—$Na_3PS_4$-CMK-3 composite is 30:40:30. Based on the $Na_2S$—$P_2S_5$ phase diagram, different ratios of $Na_2S$ and $Na_3PS_4$ can be synthesized by adjusting the ratio of the starting materials of $Na_2S$ and $P_2S_5$. And, the nano-scaled electronic and ionic conductivity of $Na_2S$—$Na_3PS_4$-CMK-3 composites can be balanced by adjusting the ratio of $Na_2S$—$P_2S_5$ to CMK-3. In the phase diagram in FIG. 2, the adjusting areas have been denoted with a double-head-arrow dashed line and the concentration of $Na_2S$ and $Na_3PS_4$ in the final product is determined based on lever rules. The lever rule is a tool to determine the mole fraction or the mass fraction of each phase of a binary equilibrium phase diagram. The lever rule can be used to determine the fraction of liquid and solid phases for a given binary composition and temperature that is between the liquidus and solidus line. One of the merits of this technique is that the solid electrolyte and active species can be precipitated in situ from the starting materials $Na_2S$ and $P_2S_5$, forming a stable interface with a low interfacial resistance and interfacial stress/strain while the liquid $Na_2S$ and $P_2S_5$ wet with CMK-3, all which ensure perfect contact among the solid electrolyte, electron conducting agent, and active species. Therefore, the utilization of the $Na_2S$ species is optimized. And, using the pre-sodiated $Na_2S$ as the cathode active species can provide enough space for the volumetric change of the electrode during sodiation/desodiation reactions.

The mixture was then transferred into a graphite crucible, which was put into a clear quartz tube and sealed under vacuum. The tube was raised to 850° C. with a ramping rate of 2° C./minute which was maintained for 1 hour. After the temperature was raised to higher than the liquidus, the $Na_2S$ and $P_2S_5$ melted with each other and formed a homogeneous liquid. The tube was then immediately transferred into ice water and quenched to 0° C. over 10 seconds. Due to the fast temperature drop, the amorphous state of the liquid was kept at room temperature. After quenching, the tube was put into an oven and annealed at 270° C. for 2 hours.

After cooling down to 25° C., the cast-annealed Na$_2$S—Na$_3$PS$_4$-CMK-3 composite was taken out from the quartz tube in the glovebox. For the reference, a Na$_2$S—Na$_3$PS$_4$-CMK-3 composite with the same mass rate was prepared by ball milling the Na$_2$S, Na$_3$PS$_4$, and CMK-3 mixture at a fixed rotation speed of 370 rpm for 1 hour.

Example 2

Characterization of the Na$_2$S—Na$_3$PS$_4$-CMK-3 Composite

X-ray powder diffraction (XRD) was performed on a SMART 1000 diffractometer (Bruker, Billerica, MA) with Cu Kα radiation. Scanning electron microscopy (Hitachi SU-70, Tokyo, Japan) and transmission electron microscopy (JEM-2100 (LaB$_6$ electron gun, 200 kV), JEOL, Tokyo, Japan) were utilized to characterize the morphology and microstructure of the samples. N$_2$ adsorption by means of a Micromeritics ASAP 2020 Porosimeter Test Station (Micromeritics Instruments Corp., Norcross, GA) was used to obtain the specific surface areas, pore volumes, and related pore size distributions of the samples. Before characterization, all of the samples were evacuated and degassed at 180° C. for 12 hours. The specific surface areas of the samples were obtained using the Brunauer-Emmett-Teller method. The Barrett-Joyner-Halenda equation was utilized to obtain the porosity distribution of the samples. Raman spectra were tested on a LabRAM Aramis (Horiba Jobin Yvon, Kyoto, Japan) with a 532 nm diode-pumped solid-state laser.

Figure 3:
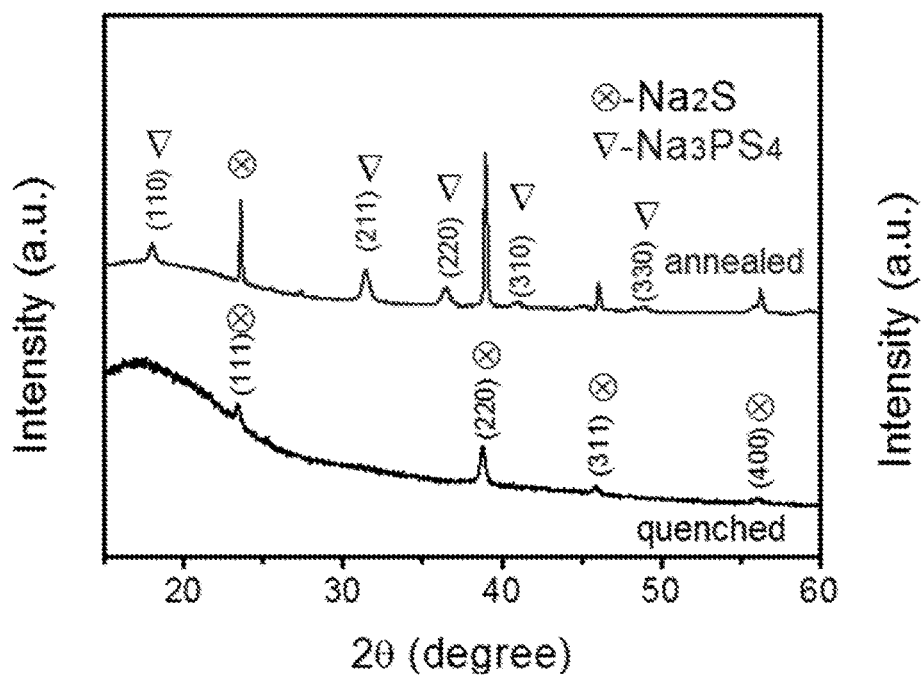
FIG. 3 is a line graph depicting X-ray diffraction (XRD) patterns of the quenched $Na_2S$—$Na_3PS_4$-CMK-3 composite before and after annealing.
Figure 4:
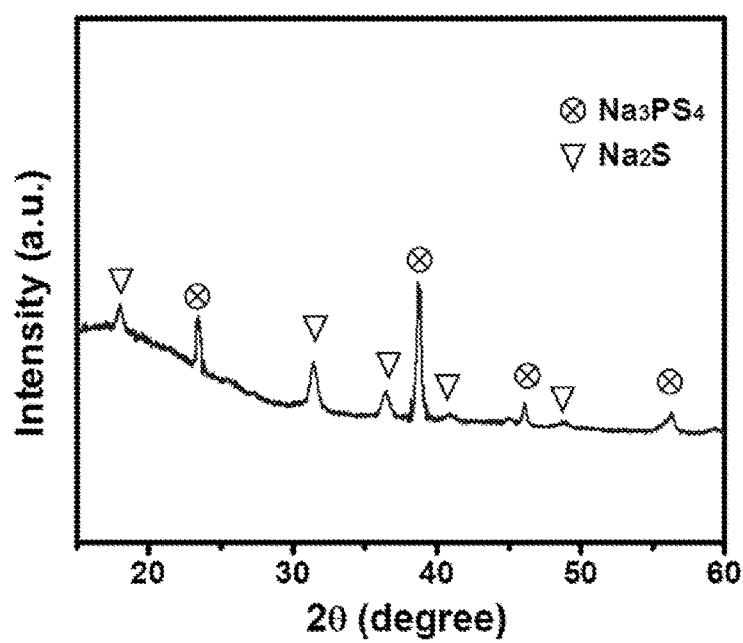
FIG. 4 is a line graph depicting XRD patterns for the ball milled $Na_2S$—$Na_3PS_4$-CMK-3 composite.
Figure 5:
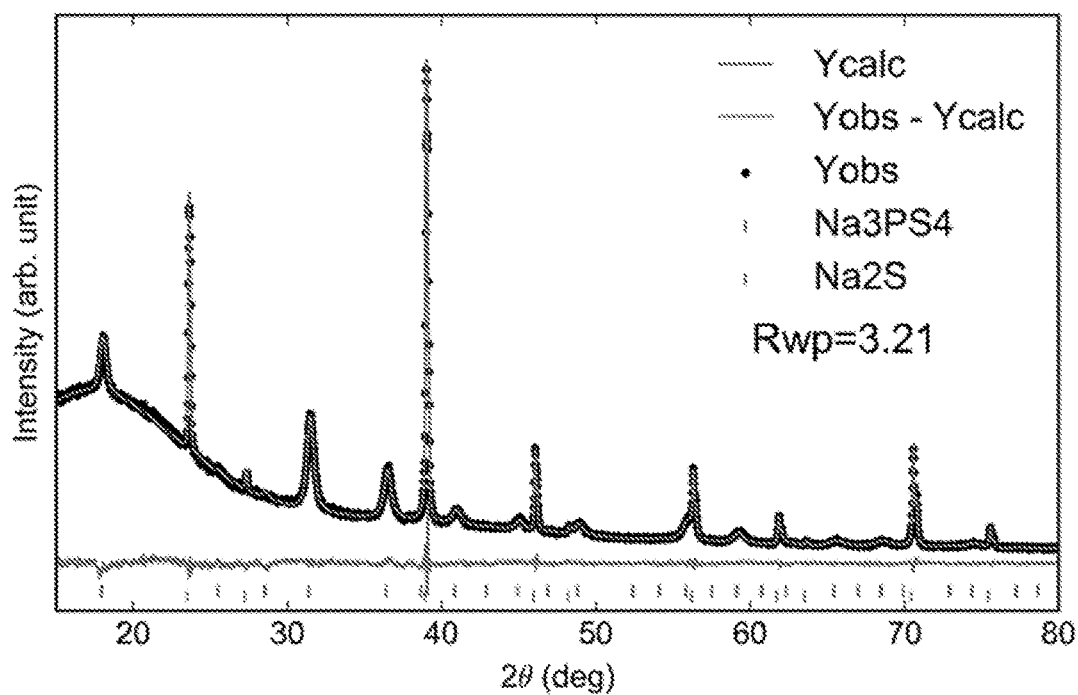
FIG. 5 is a line graph depicting Rietveld refinements of X-ray diffraction data of the as-synthesized cast-annealed $Na_2S$—$Na_3PS_4$-CMK-3 composite after heating at 270° C. for 2 hours. All of the peaks can be ascribed to $Na_2S$ and $Na_3PS_4$ phase.

XRD patterns of the quenched Na$_2$S—Na$_3$PS$_4$-CMK-3 composites before and after heating at 270° C. for 2 hours are shown in FIG. 3. Several small peaks were observed in the quenched sample, which can be indexed to the (111), (220), (311), and (400) of Na$_2$S. The formation of the tiny crystalline Na$_2$S may be due to the ready crystallization during the quenching process. After heating at 270° C. for 2 hours, the peak intensity of Na$_2$S dramatically increased along with the appearance of new peaks from crystallization of the Na$_3$PS$_4$ phase. The unusual background between 10° and 30° arises from amorphous scattering caused by the KAPTON film used to seal the sample during XRD characterization. XRD patterns of the ball milled Na$_2$S—Na$_3$PS$_4$ (FIG. 4) and Na$_2$S—Na$_3$PS$_4$-CMK-3 composite (FIG. 5) show only Na$_3$PS$_4$ and Na$_2$S phases. No impurities were detected in either sample.

Figure 6:
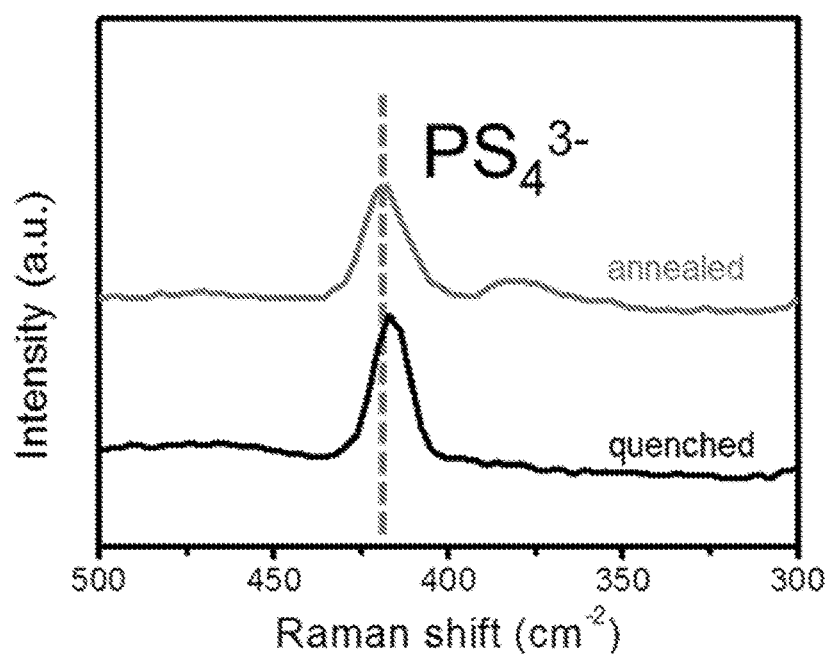
FIG. 6 is a line graph depicting Raman spectra of the quenched and the cast-annealed $Na_2S$—$Na_3PS_4$-CMK-3 composite.

Raman spectra of the quenched and the annealed Na$_2$S—Na$_3$PS$_4$-CMK-3 composites are shown in FIG. 6. The Raman spectra reveals that the thiophosphate ions have been formed in the melting process and preserved after quenching as evidenced by the characteristic peak of PS$_4^{3-}$ ions at 420 cm$^{-1}$. In the casting and subsequent annealing process, Na$_3$PS$_4$ was formed, as shown in equation (1):

$$3Na_2S + P_2S_5 \rightarrow 2Na_3PS_4 \qquad (1)$$

Figure 7:
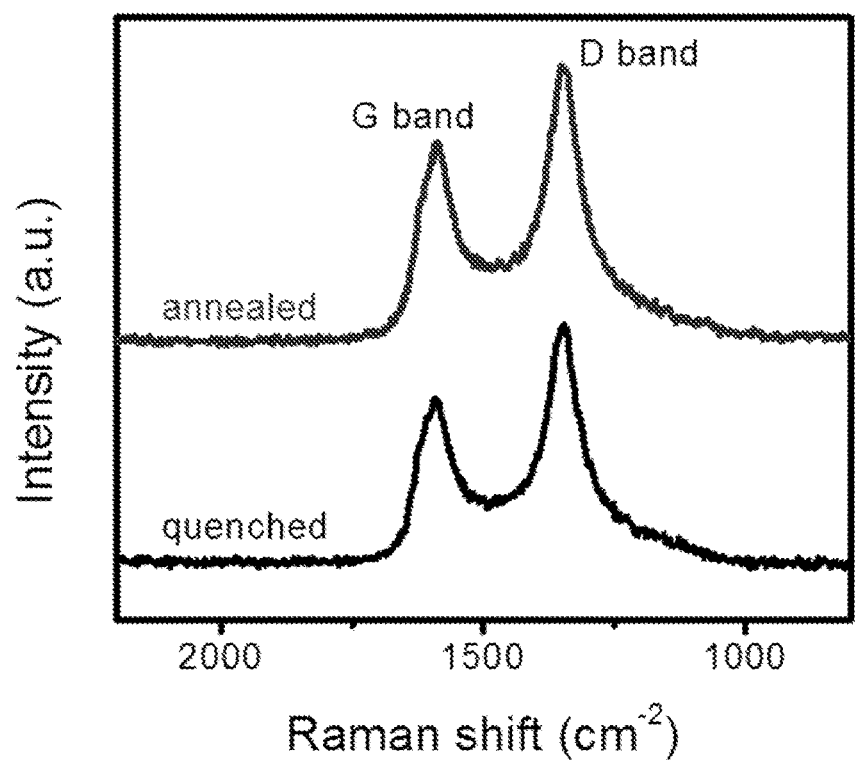
FIG. 7 is a line graph depicting Raman spectra of quenched $Na_2S$—$Na_3PS_4$-CMK-3 composite before and after annealing. Two characteristic peaks around 1330 and 1590 cm−1 could be ascribed to the D band and G band of graphitic carbon, respectively.

After annealing, a shoulder at 380 cm$^{-1}$ appeared in the Raman spectra, which can be ascribed to precipitated Na$_2$S species. As shown in FIG. 7, two characteristic peaks detected at around 1590 and 1330 cm$^{-1}$ were from the G band and D band of graphitic carbon in CMK-3, respectively.

Figure 8:
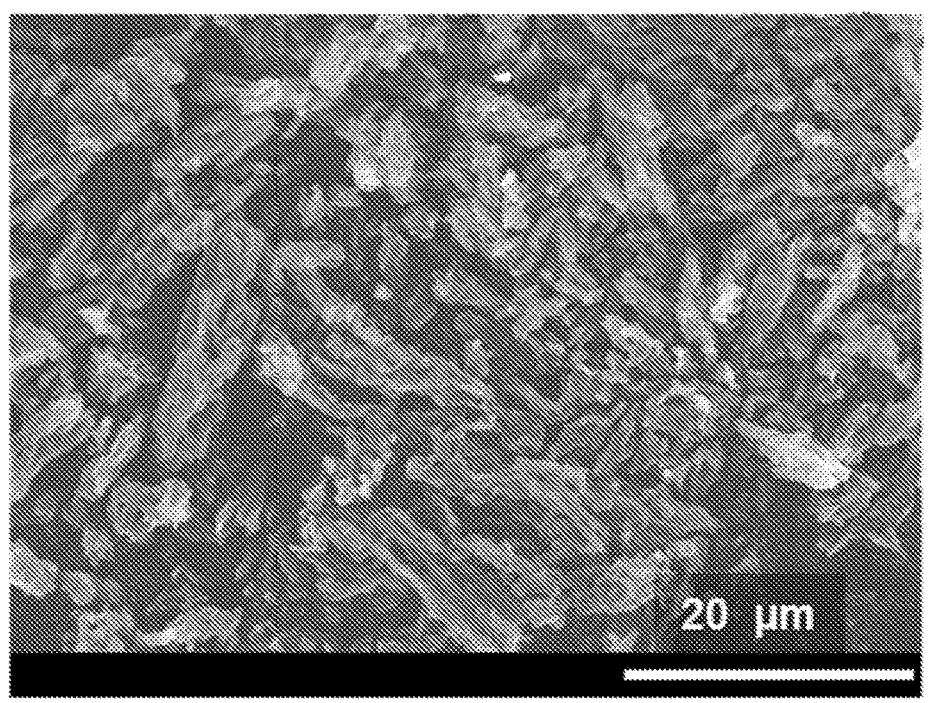
FIG. 8 is a scanning electron microscope (SEM) image of the CMK-3 mesoporous carbon.
Figure 9:
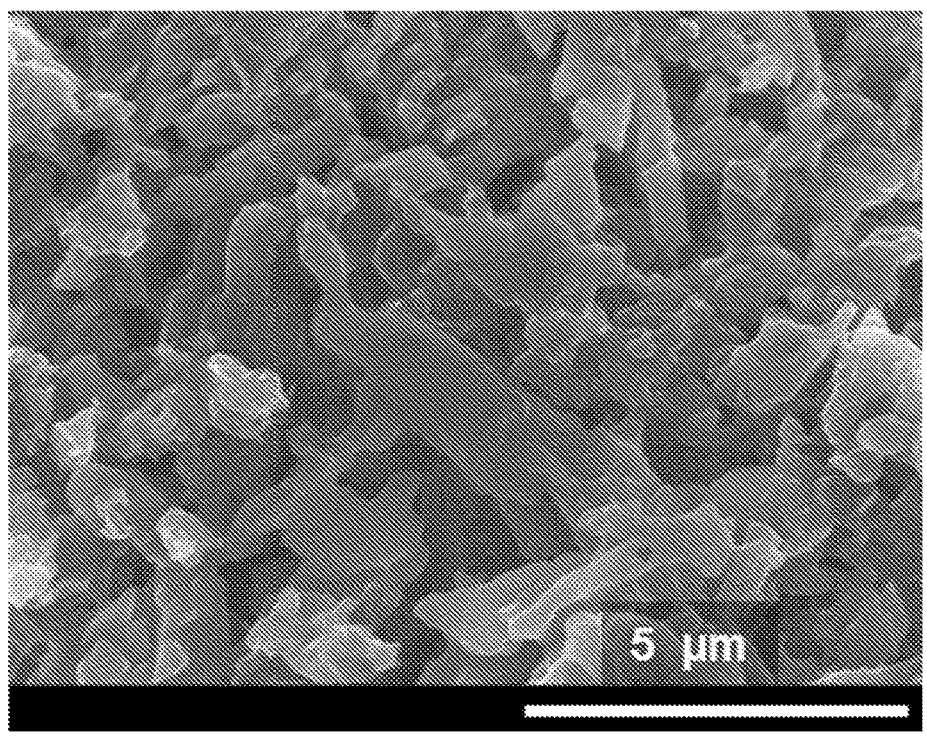
FIG. 9 is an SEM micrograph of the in situ synthesized cast-annealed $Na_2S$—$Na_3PS_4$-CMK-3 composite.
Figure 10:
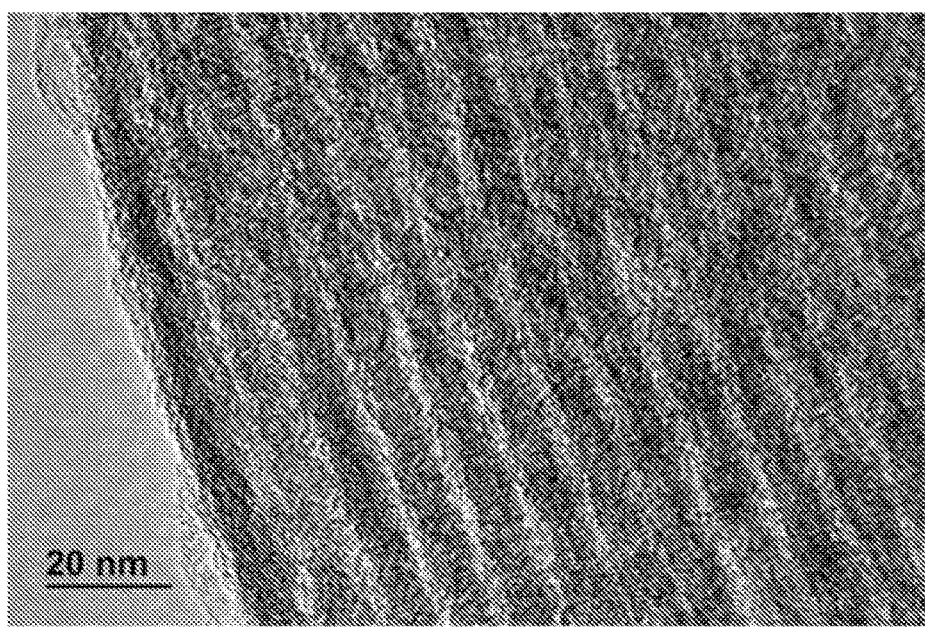
FIG. 10 is a transmission electron microscope (TEM) image of the CMK-3 channel structure.
Figure 11:
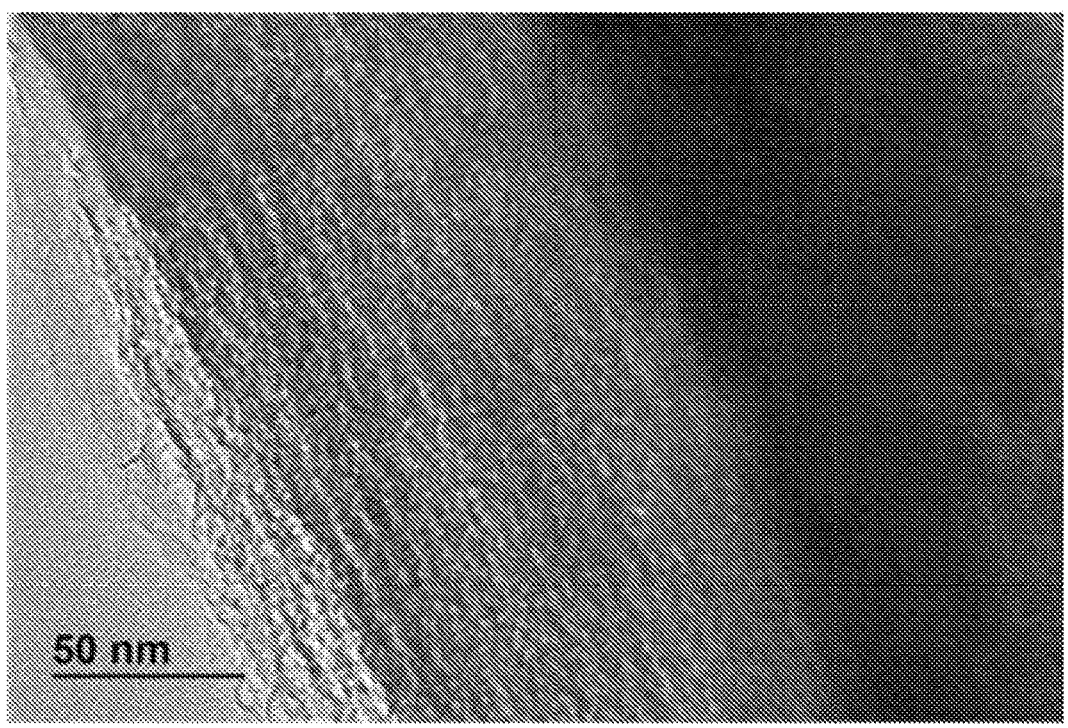
FIG. 11 is a TEM image of the as-synthesized cast-annealed $Na_2S$—$Na_3PS_4$-CMK-3 composite.
Figure 12:
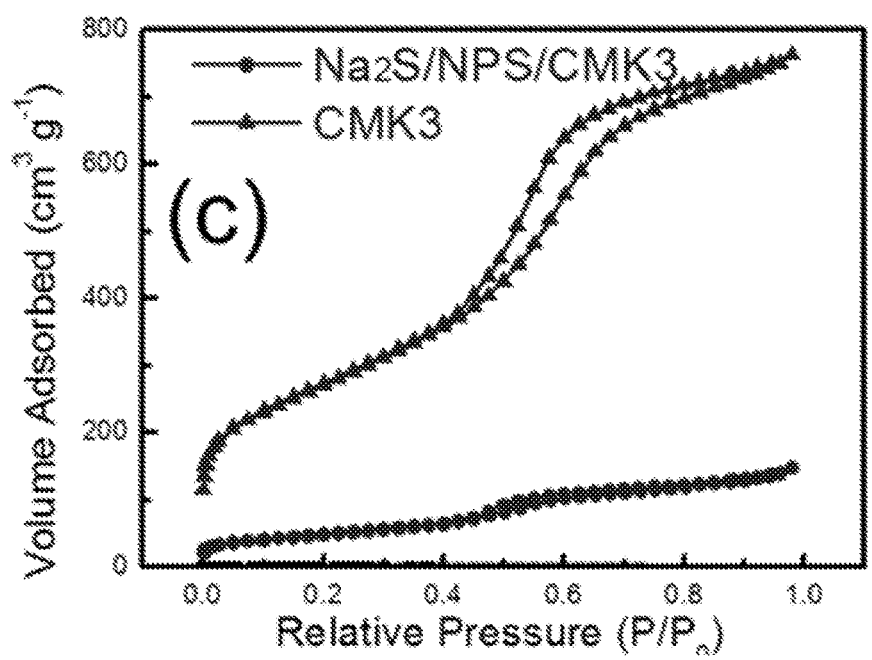
FIG. 12 is a line graph depicting $N_2$ adsorption/desorption isotherm of the mesoporous carbon (CMK-3) and the as-synthesized cast-annealed $Na_2S$—$Na_3PS_4$-CMK-3 composite.
Figure 13:
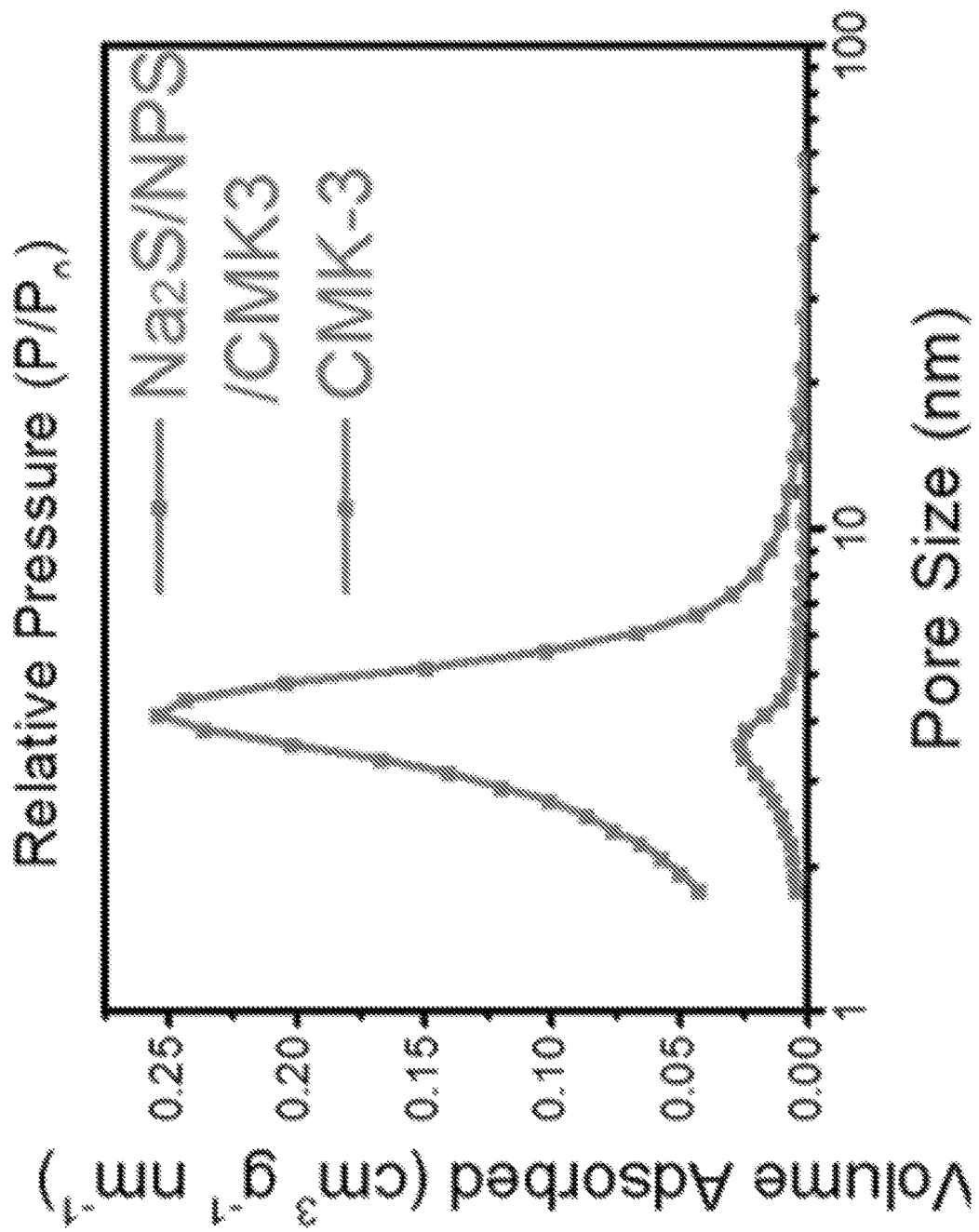
FIG. 13 is a line graph depicting the distribution curves of the corresponding Barrett-Joyner-Halenda pore size of CMK-3 and $Na_2S$—$Na_3PS_4$-CMK-3 composite cathode.
Figure 15:
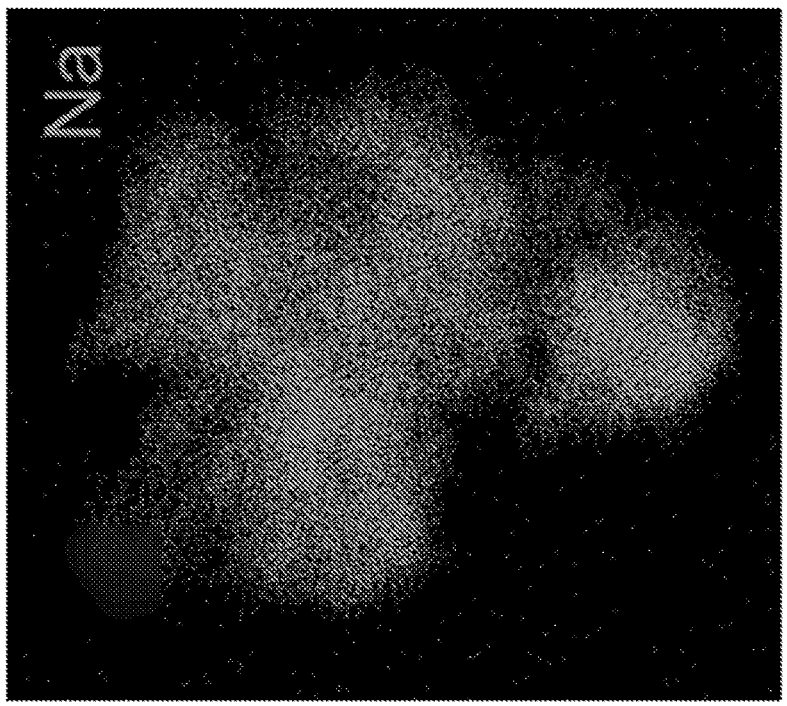
FIG. 15 is a HAADF-STEM image of the elemental mapping of sodium (Na) in the cast-annealed $Na_2S$—$Na_3PS_4$-CMK-3 composite.
Figure 14:
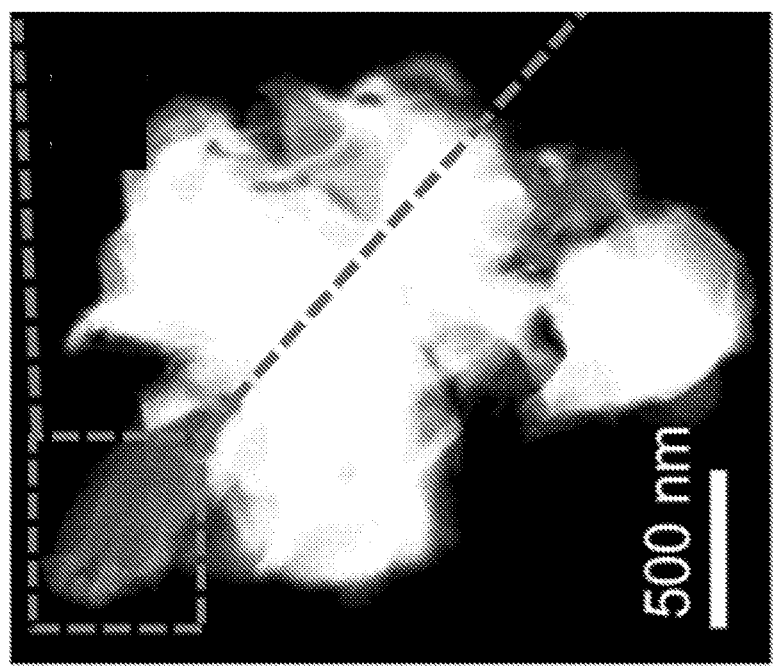
FIG. 14 is a high angle annular dark-filed scanning transmission electron microscope (HAADF-STEM) image of the cast-annealed $Na_2S$—$Na_3PS_4$-CMK-3 composite.
Figure 17:
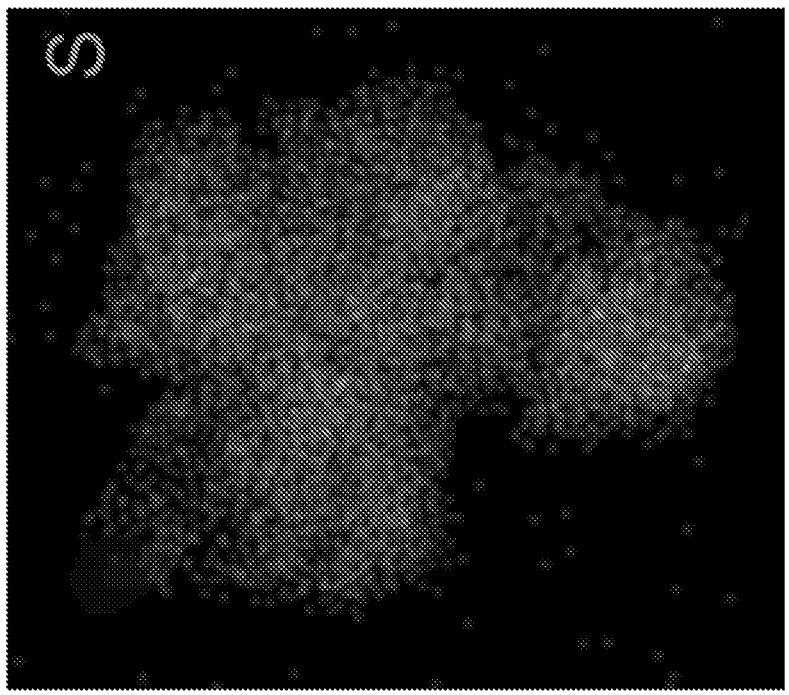
FIG. 17 is a HAADF-STEM image of the elemental mapping of sulfur (S) in the cast-annealed $Na_2S$—$Na_3PS_4$-CMK-3 composite.
Figure 16:
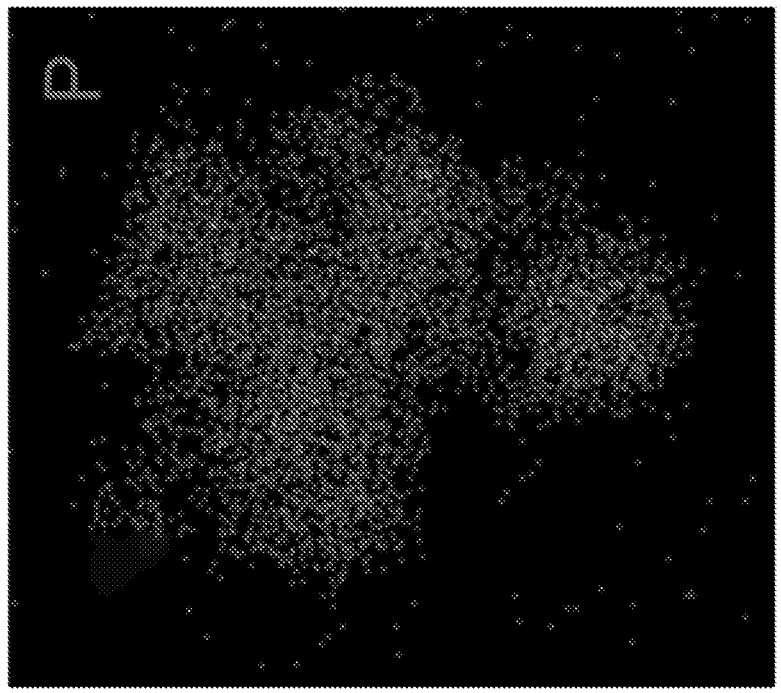
FIG. 16 is a HAADF-STEM image of the elemental mapping of phosphorus (P) in the cast-annealed $Na_2S$—$Na_3PS_4$-CMK-3 composite.
Figure 18:
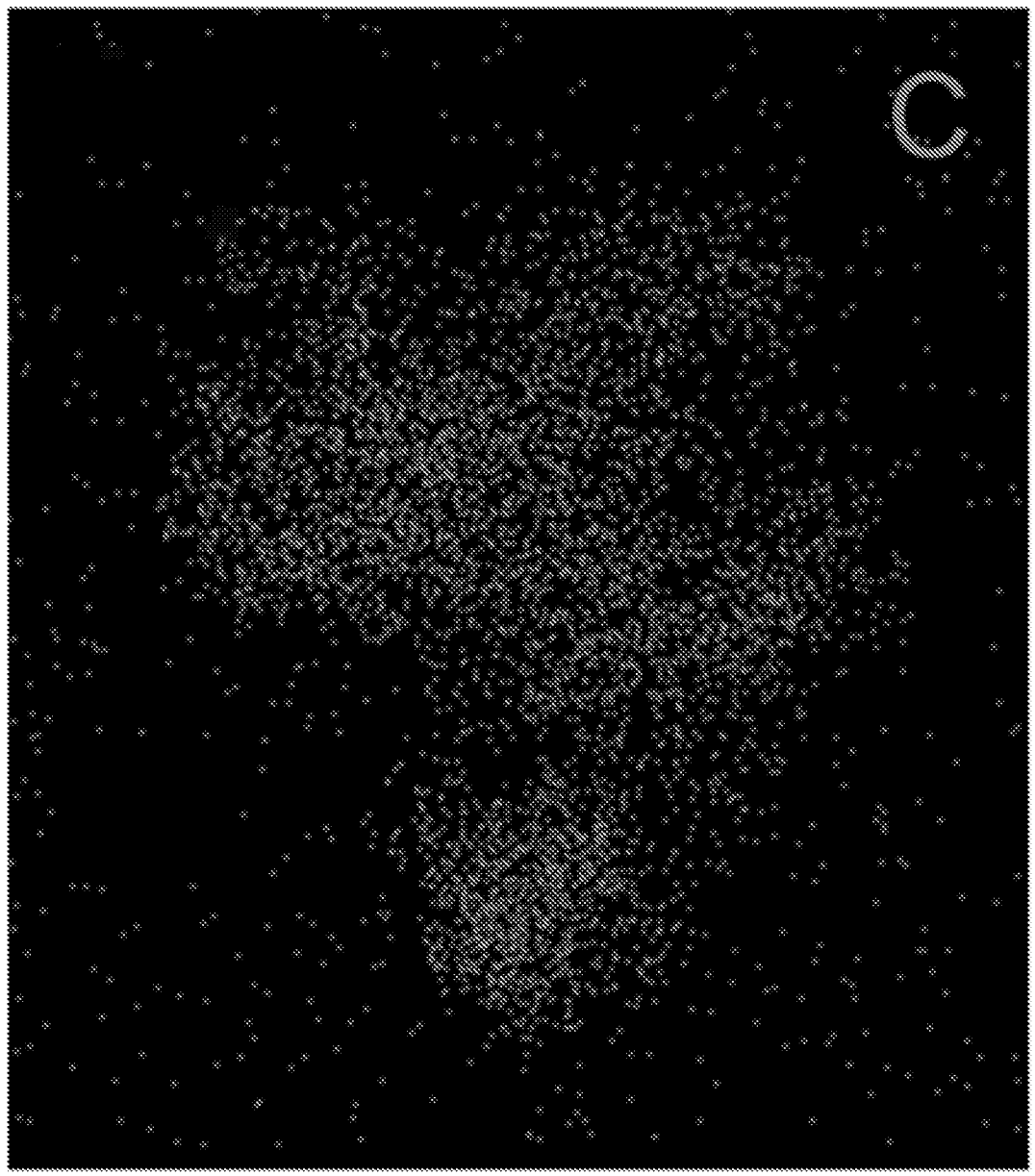
FIG. 18 is a HAADF-STEM image of the elemental mapping of carbon (C) in the cast-annealed $Na_2S$—$Na_3PS_4$-CMK-3 composite.
Figure 19:
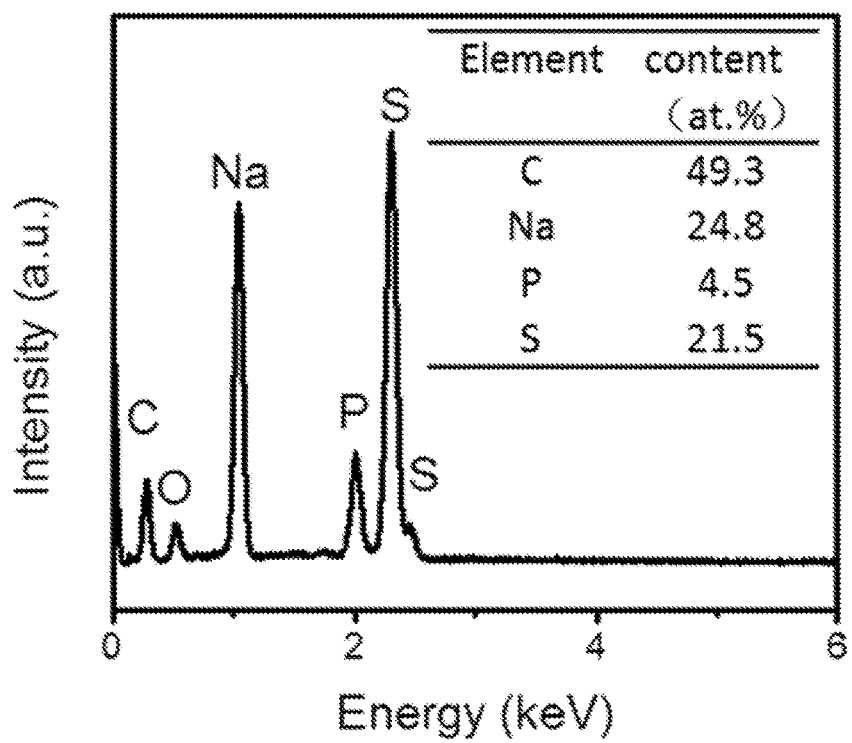
FIG. 19 is a line graph depicting the elemental ratio results the cast-annealed $Na_2S$—$Na_3PS_4$-CMK-3 composite.
Figure 20:
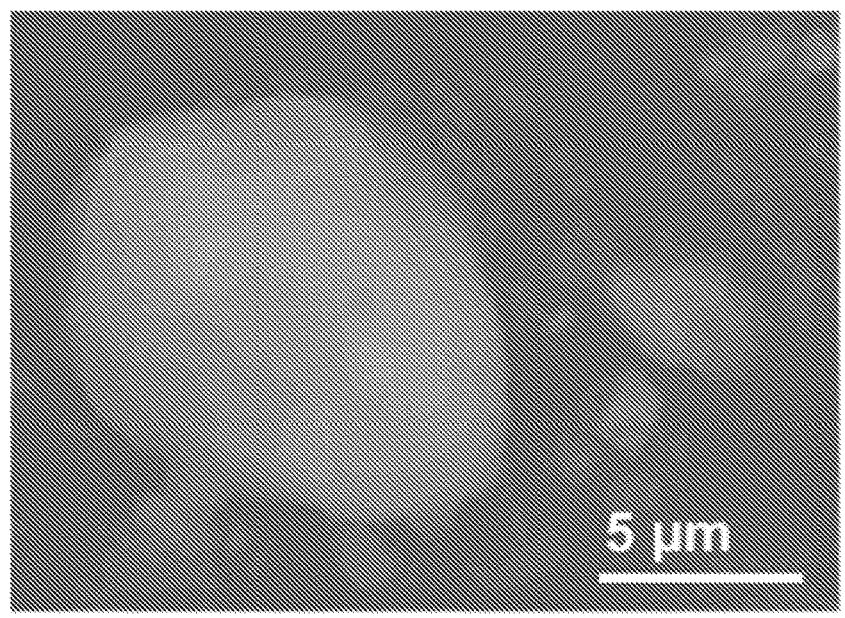
FIG. 20 is an SEM image of the cast-annealed $Na_2S$—$Na_3PS_4$-CMK-3 composite.
Figure 21:
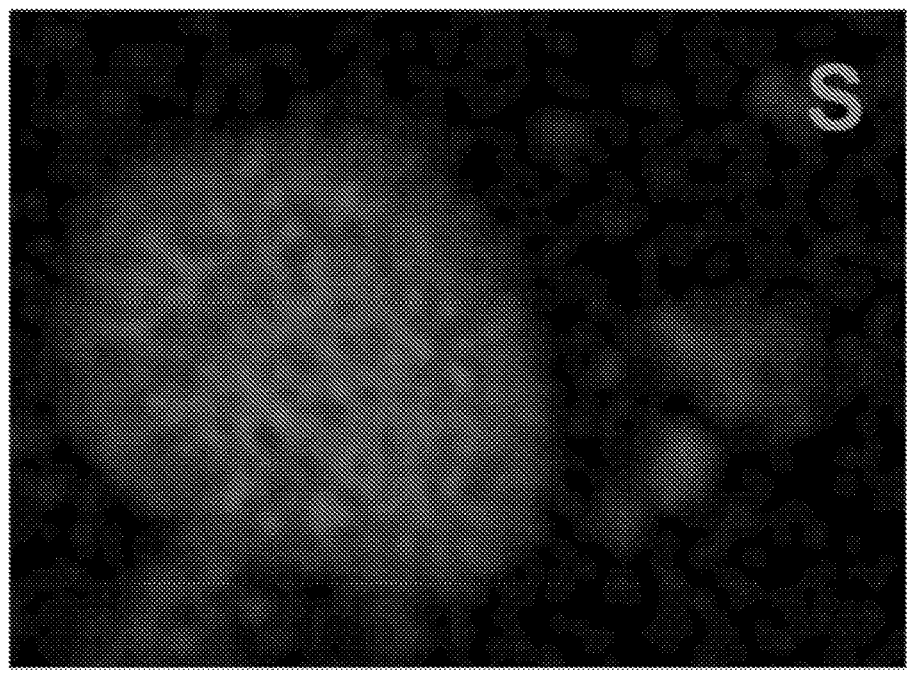
FIG. 21 is an SEM image of the corresponding elemental mapping of sulfur (S) in the ball milled $Na_2S$—$Na_3PS_4$-CMK-3 composite.
Figure 22:
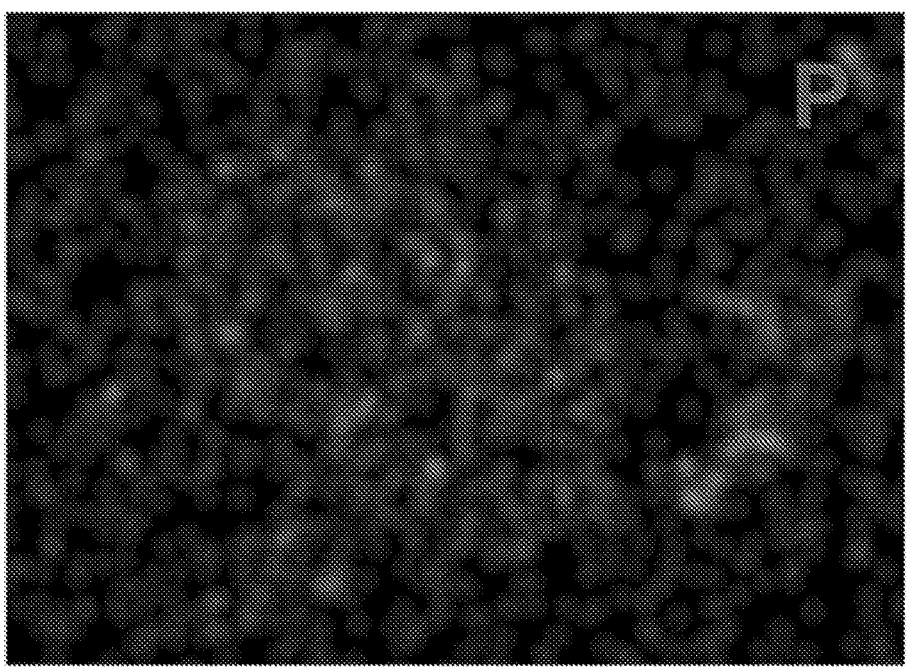
FIG. 22 is an SEM image of the corresponding elemental mapping of phosphorus (P) in the ball milled $Na_2S$—$Na_3PS_4$-CMK-3 composite.
Figure 23:
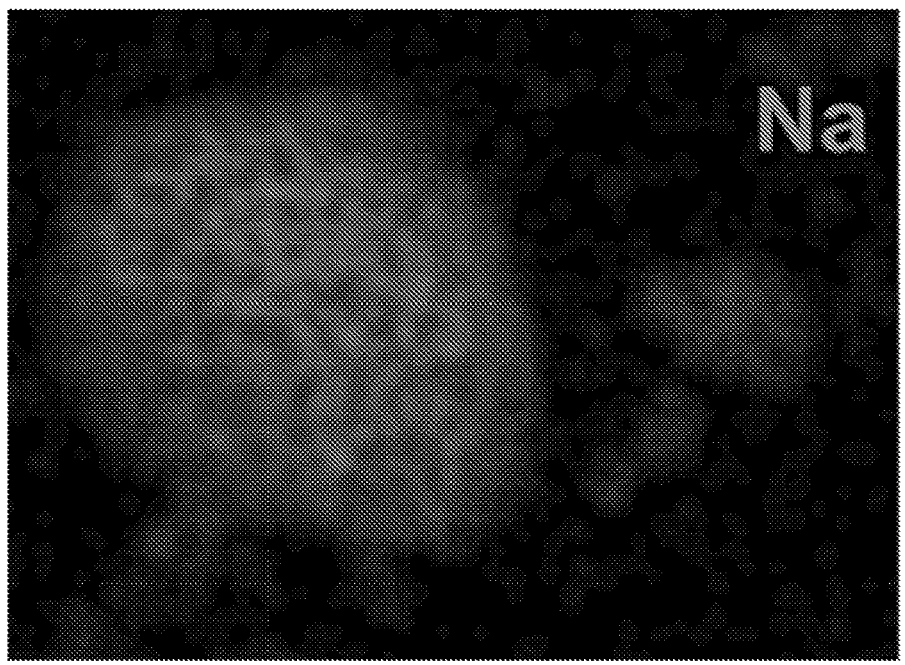
FIG. 23 is an SEM image of the corresponding elemental mapping of sodium (Na) in the ball milled $Na_2S$—$Na_3PS_4$-CMK-3 composite.
Figure 24:
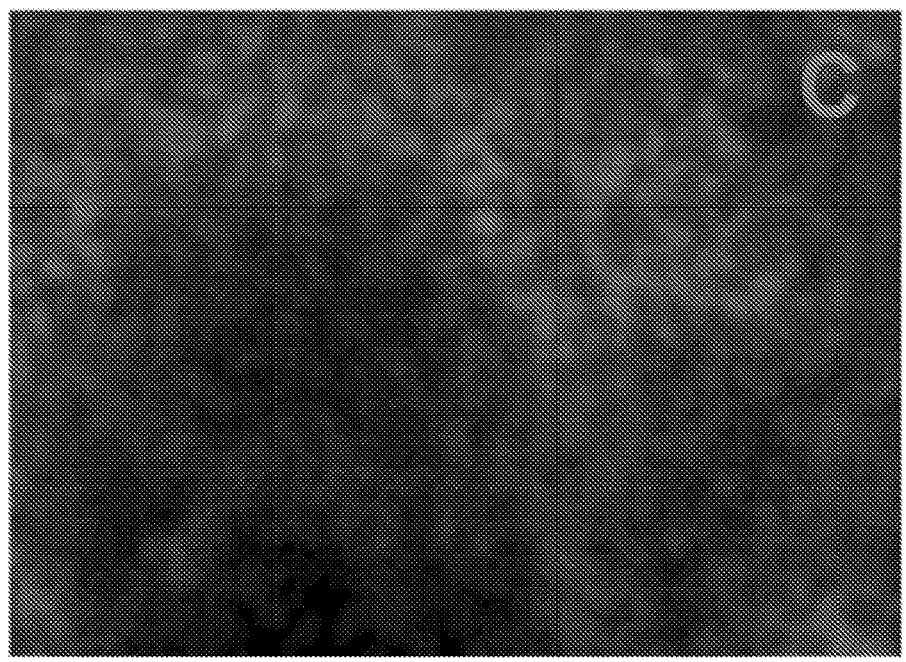
FIG. 24 is an SEM image of the corresponding elemental mapping of carbon (C) in the ball milled $Na_2S$—$Na_3PS_4$-CMK-3 composite.
Figure 25:
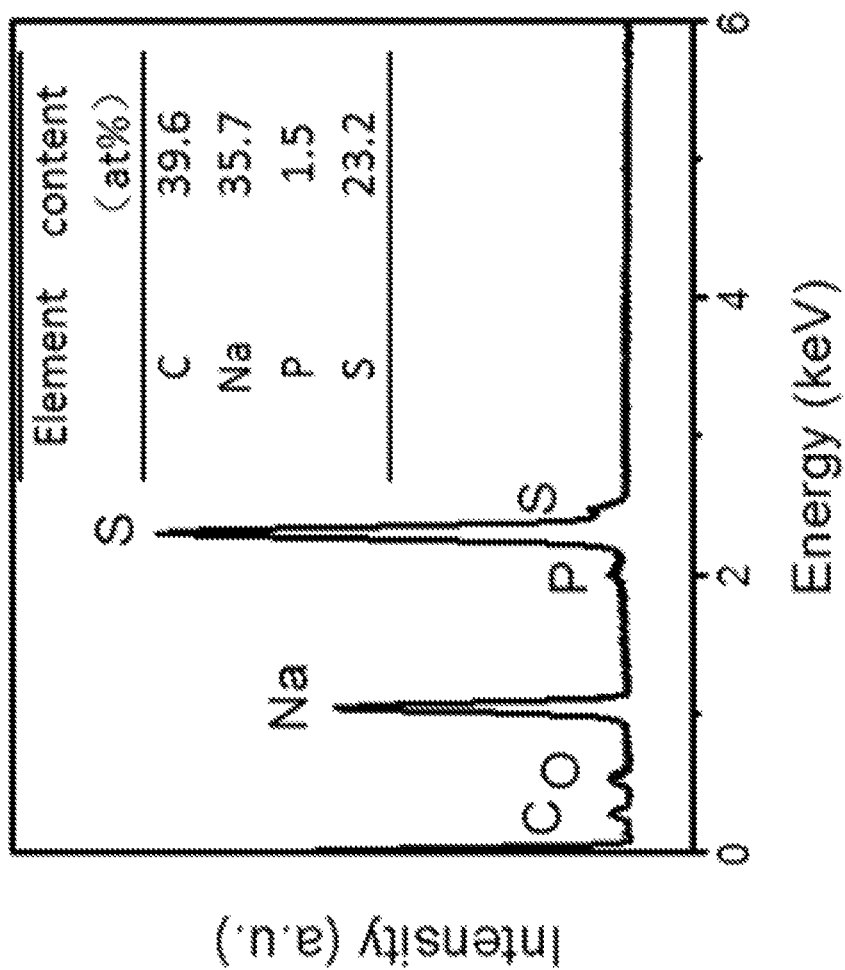
FIG. 25 is a line graph depicting the elemental ratio result of the ball milled $Na_2S$—$Na_3PS_4$-CMK-3 composite. It can be seen that significant phosphorus (P) segregation can be observed for the ball milled $Na_2S$—$Na_3PS_4$-CMK-3 composite.

FIG. 8 and FIG. 9 show SEM images of CMK-3 and the cast-annealed Na$_2$S—Na$_3$PS$_4$-CMK-3 composite after heating at 270° C. for 2 hours. CMK-3 shows a rod-like macrostructure with uniform size of 2-3 μm (FIG. 8). After impregnation of Na$_2$S—Na$_3$PS$_4$, CMK-3 retains its original morphology without any fracture. All of the pores in CMK-3 mesoporous particles were infiltrated by the melting Na$_2$S—Na$_3$PS$_4$ composite due to capillarity. Apart from the Na$_2$S—Na$_3$PS$_4$ inside the channels of the CMK-3, some Na$_2$S—Na$_3$PS$_4$ composites were also coated on the surface of the mesoporous carbons, forming an ionic conducting network (FIG. 9). These infiltrated CMK-3 particles agglomerated into large particles during the solidification process of melting solid electrolyte between the CMK-3 particles. The cast-annealed Na$_2$S—Na$_3$PS$_4$-CMK-3 in the graphite crucible forms a free-standing rod. The 1D highly ordered channel structure of the CMK-3 with uniform channel diameter of ~4 nm is confirmed by the transition electron microscopy (TEM) image shown in FIG. 10. As shown in FIG. 11, almost all of the CMK-3 channels are filled after impregnation with Na$_2$S—Na$_3$PS$_4$. The Na$_2$S—Na$_3$PS$_4$ infiltration dramatically reduced the Brunauer-Emmett-Teller specific surface area from 1002 m$^2$/g for CMK-3 to 80 m$^2$/g for Na$_2$S—Na$_3$PS$_4$-CMK-3, (FIG. 12), and decreased the pore volume from 0.91 cm$^3$/g of CMK-3 to 0.07 cm$^3$/g of Na$_2$S—Na$_3$PS$_4$-CMK-3, (FIG. 13). As shown in FIG. 12, the nitrogen adsorption-desorption isotherms of CMK-3 shows a typical IV isotherm, presenting a feature of the mesoporous structures with a clear H1 hysteresis loop and narrow mesopore distribution peaks at ~4 nm, in line with the TEM images of CMK-3 (FIG. 10). After infiltration of the Na$_2$S—Na$_3$PS$_4$ materials into the CMK-3 channels, the hysteresis loop disappeared, and the mesoporous volume decreased dramatically, indicating that Na$_2$S—Na$_3$PS$_4$ was occupying the mesoporous channels. To further confirm the penetration/infiltration of Na$_2$S—Na$_3$PS$_4$ into the porous CMK-3, high angle annular dark-field scanning transmission electron microscopy (HAADF-STEM) with EDX mapping was carried out (FIG. 14 and FIGS. 15-18). The intensity of the HAADF-STEM images is proportional to z1.7 (z is the atomic number). In FIG. 14, the bright areas correspond to the Na$_2$S—Na$_3$PS$_4$. Even in the less bright areas, all of the Na, P, S, and C are totally overlapped, indicating the homogeneous distribution of the Na$_2$S active species, Na$_3$PS$_4$ solid electrolyte, and CMK-3 mesoporous carbon. Large scale energy dispersive spectroscopy (EDS) analysis confirms the presence of the Na, P, S, and C in all of the composite particles, and all of these elements are ideally overlapped in the composite; therefore, close contacts among the three components are obtained in the cast-annealed Na$_2$S—Na$_3$PS$_4$-CMK-3 composite. And, as shown in FIG. 19, elemental analysis further confirmed the presence of the Na, P, S, and C in all of the composite particles.

Significant elemental segregation was detected in the ball milled Na$_2$S—Na$_3$PS$_4$-CMK-3 composite (FIGS. 20-25), synthesized by ball milling the mixture of Na$_2$S, Na$_3$PS$_4$ and CMK-3 for 1 hour. All the characterizations of cast-annealed Na$_2$S—NPS—C nanocomposite demonstrate that the casting-annealing process is a promising technology for synthesis of composite cathodes for ASSBs.

Example 3

Electrochemical Measurements of the Na$_2$S—Na$_3$PS$_4$-CMK-3 Composite

Figure 26:
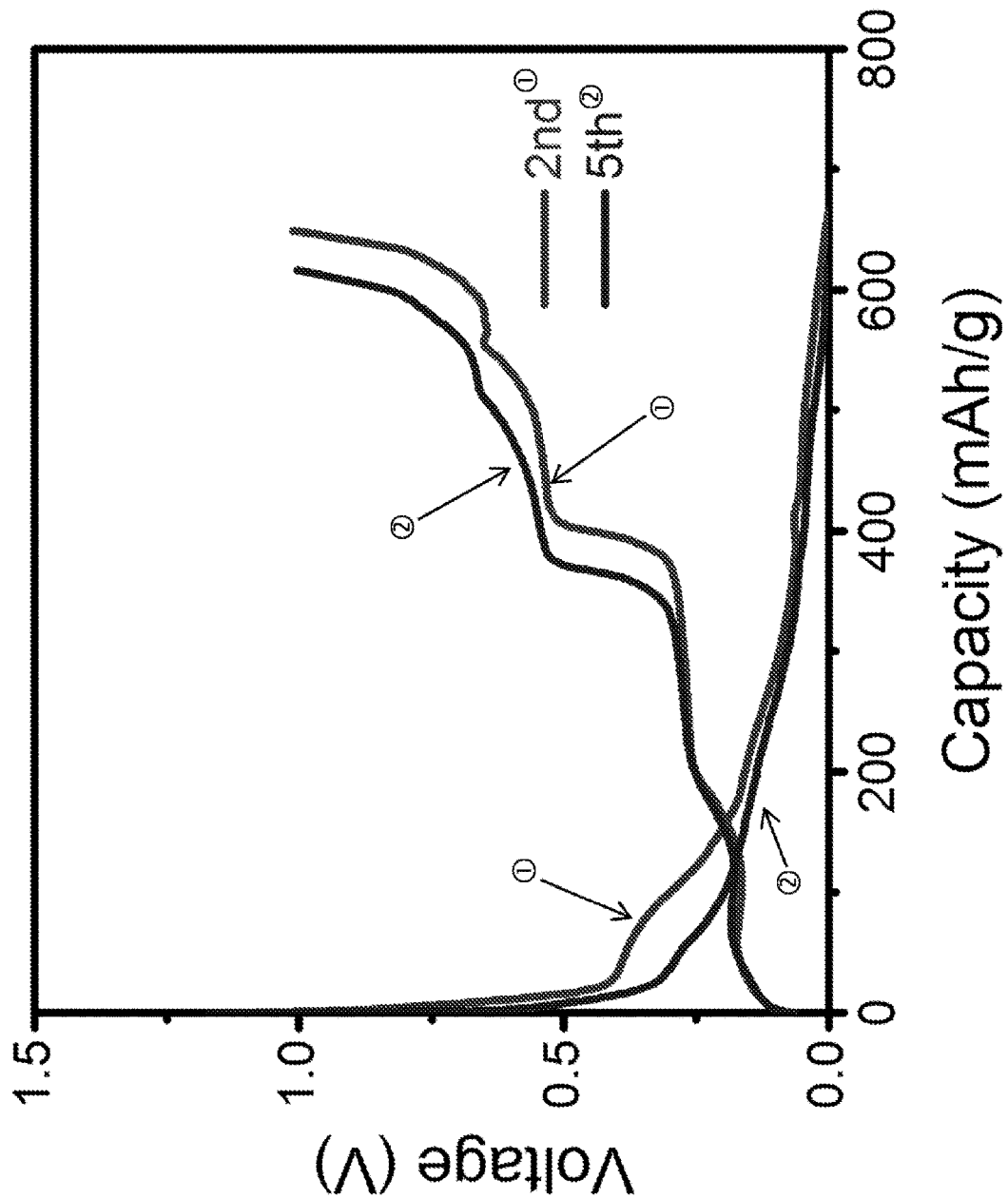
FIG. 26 is a line graph depicting charge/discharge curves (the charge curves are labelled ① and ② on the right-hand side of the graph and the discharge curves are labelled ① and ② on the left-hand side of the graph) of the $Na_{15}Sn_4$-AB (AB=acetylene black) electrode vs. Na metal electrode using a carbonate electrolyte (1 M $NaPF_6$ in EC/DMC).
Figure 27:
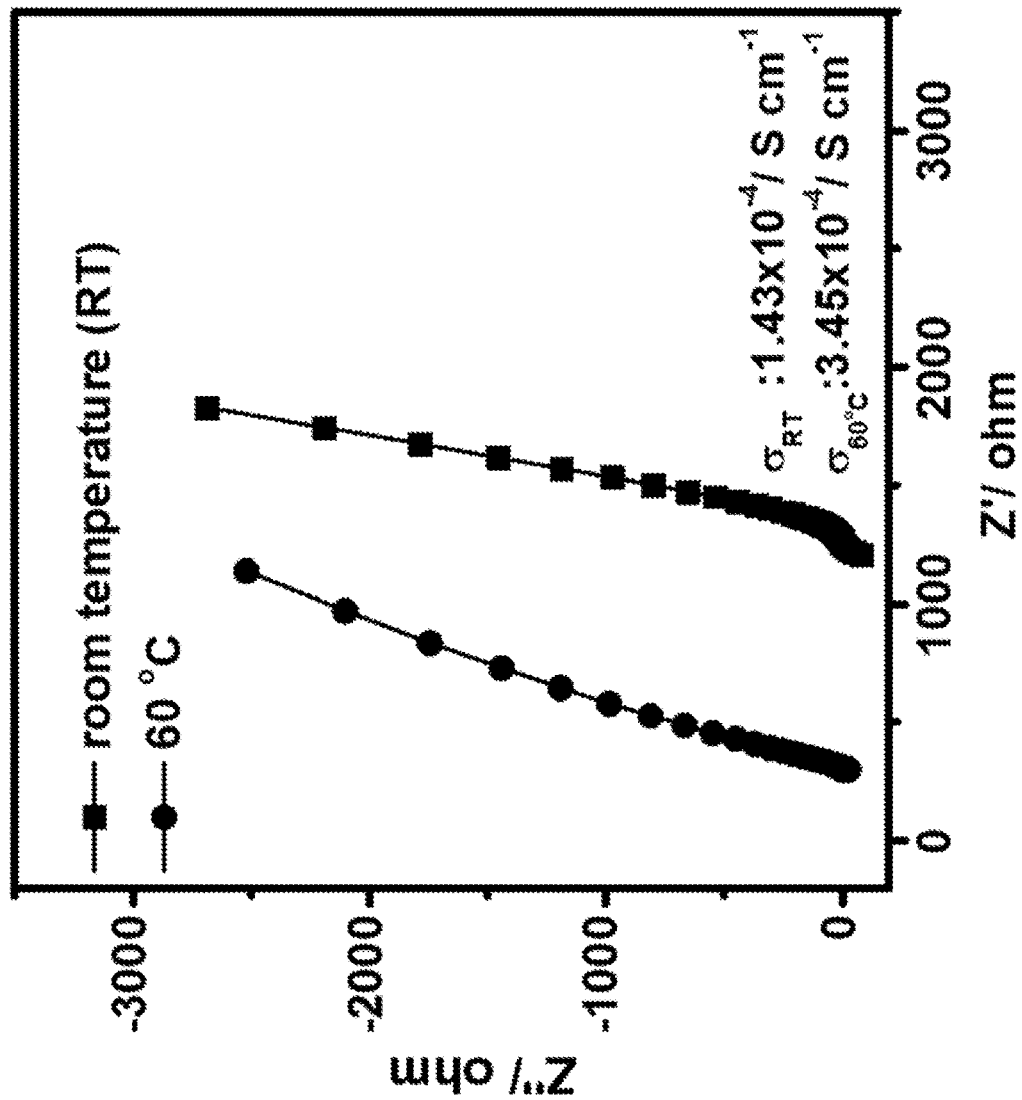
FIG. 27 is a line graph depicting the electrochemical impedance spectra of the $Na_3PS_4$ electrolyte. The AC impedance spectra were obtained with a Pt/$Na_3PS_4$/Pt cell tested at room temperature (25° C.) and 60° C.

An all-inorganic solid-state sodium-sulfur battery was fabricated using the Na$_2$S—Na$_3$PS$_4$-CMK-3 composite as a working electrode and Na$_3$PS$_4$ as the solid electrolyte. Na metal is highly reactive to the sulfide solid electrolyte and readily forms Na$_2$S and Na$_3$P. The in situ formed Na$_2$S and $Na_3P$ interphases can dramatically increase the interfacial resistance between a Na anode and $Na_3PS_4$. Besides, Na dendrites would also grow in the solid-state electrolyte if Na metal was utilized as the anode. Therefore a $Na_{15}Sn_4$-AB composite (AB is acetylene black) was adopted as the reference electrode and anode (FIG. 26). The ionic conductivities of $Na_3PS_4$ solid electrolyte were measured in an ion-blocking Pt/$Na_3PS_4$/Pt cell using electrochemical impedance spectroscopy (EIS) at 25° C. and 60° C. The ion-blocking Pt/$Na_3PS_4$/Pt cell was prepared by cold pressing 150 mg of $Na_3PS_4$, followed by Pt sputtering. The ion conductivity of $Na_3PS_4$ calculated from the EIS profiles (FIG. 27) is $1.43 \times 10^{-4}$ S/cm at 25° C. At a high temperature of 60° C., the ion conductivity increased to $3.45 \times 10^{-4}$ S/cm. The $Na_{15}Sn_4$-AB composite was prepared as described in Hayashi, A., et al., *J. Power Sources* 258:420-423 (2014). To assemble the cell, the cast-annealed or ball milled $Na_2S$—$Na_3PS_4$-CMK-3 powder (5 mg) composite cathodes were put on one side of the $Na_3PS_4$ solid electrolyte (120 mg) in a PTFE tank. The diameter of the PTFE tank is 10 mm, and $Na_{15}Sn_4$-AB anode powders (100 mg) were placed on the other side of the solid electrolyte membrane and then pressed together. The applied pressure between two stainless steel rods is 360 MPa. Galvanostatic discharge-charge cycles were conducted using a battery cycler (LAND CT-2001A, China) with a voltage range of 0.5-3.0 V at 60° C. No extra pressure was applied during the battery test. The specific capacities and current densities were calculated based on the mass of active material ($Na_2S$). The ratio of $Na_2S$ to $Na_3PS_4$ was calculated based on the lever rule in the phase diagram. EIS were obtained using an electrochemistry workstation (Solatron 1287/1260) over a range from $1 \times 10^5$ Hz to 0.1 Hz, with an AC amplitude of 0.02 V.

The electrochemical performances of the $Na_2S$—$Na_3PS_4$-CMK-3 cathodes were evaluated in ASSBs at 60° C. using $0.75Na_2S \cdot 0.25P_2S_5$ ($Na_3PS_4$) glass-ceramic as the solid electrolyte and Na—Sn alloy mixed with carbon black as an anode. For reference, the $Na_2$—$Na_3PS_4$-CMK-3 composite synthesized by ball milling the mixture of $Na_2S$, $Na_3PS_4$, and CMK-3 for 1 hour was also tested. The utilization of Na—Sn alloy as the anode material during the battery test can lower the interfacial resistance/instability at the anode/solid-electrolyte interface, and suppress the detrimental Na dendrites formed during cycling. Therefore Na—Sn alloy anodes will not limit the performance of ASSBs, and the performance differences of ASSBs using different cathodes are attributed to cathode performance.

Figure 28:
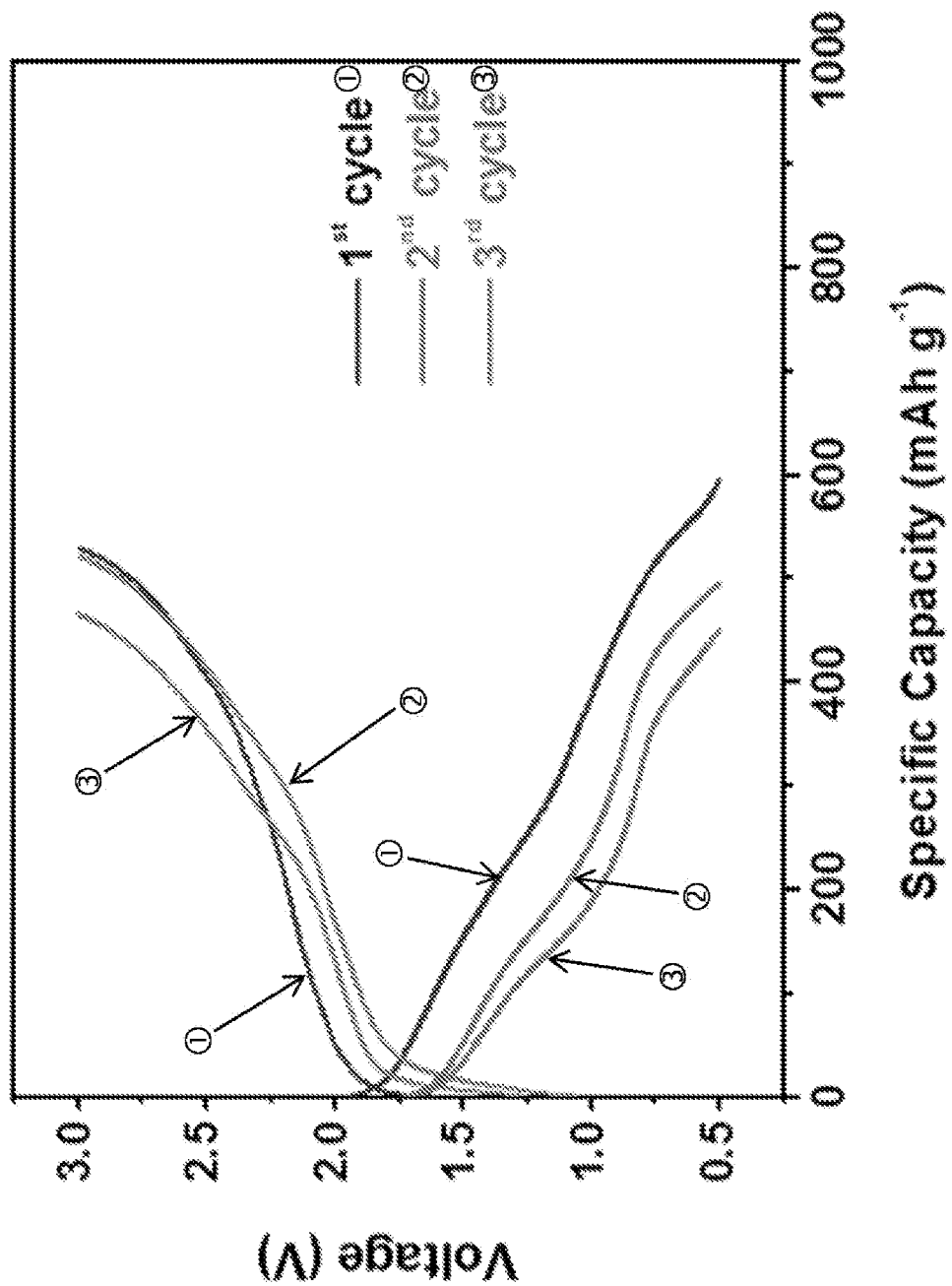
FIG. 28 is a line graph depicting the electrochemical performances of cast-annealed $Na_2S$—$Na_3PS_4$-CMK-3 composite cathodes in ASSB tested at 60° C. between 0.5 and 3 V. The upper axis (labelled ①, ②, and ③) shows the total capacity of the electrode, the lower one (labelled ①, ②, and ③) shows the specific capacity calculated based on the weight of $Na_2S$ in the electrode.
Figure 29:
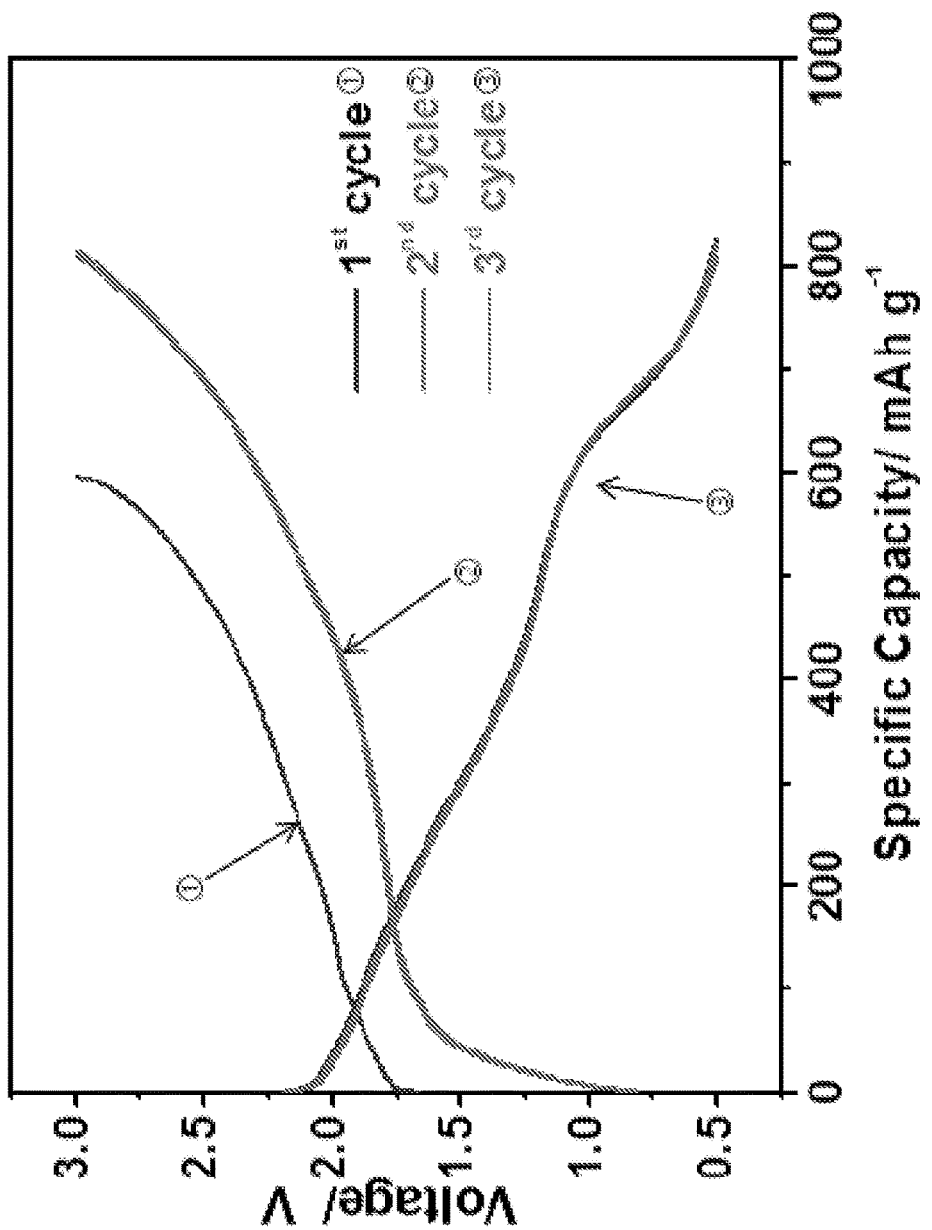
FIG. 29 is a line graph depicting the electrochemical performances of the ball-milled $Na_2S$—$Na_3PS_4$-CMK-3 composite cathodes in ASSB tested at 60° C. between 0.5 and 3 V. The upper axis shows the total capacity of the electrode, the lower on showing the specific capacity calculated based on the weight of $Na_2S$ in the electrode.
Figure 30:
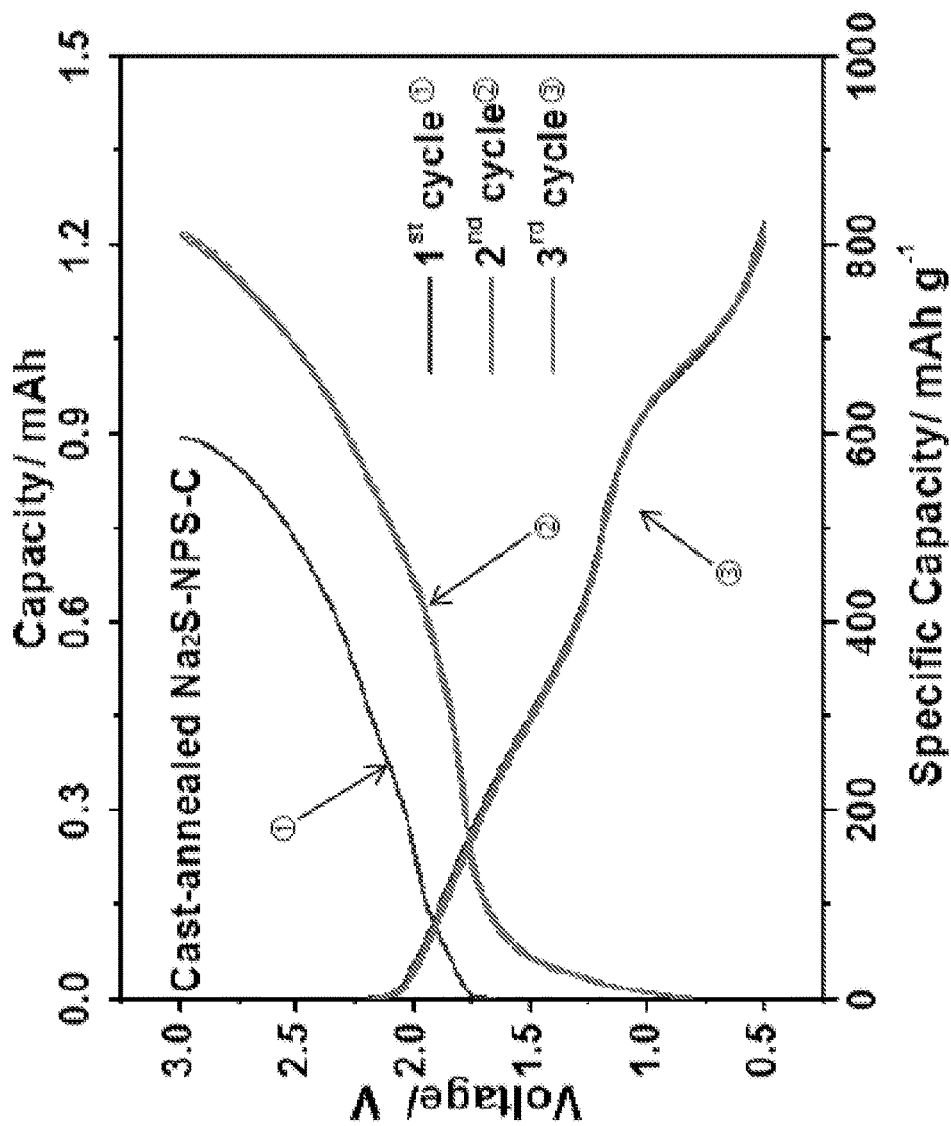
FIG. 30 is a line graph depicting the electrochemical performances of the cast-annealed $Na_2S$—$Na_3PS_4$-CMK-3 composite. The upper axis shows the total capacity of the electrode, the lower one showing the specific capacity calculated based on the weight of $Na_2S$ in the electrode.
Figure 31:
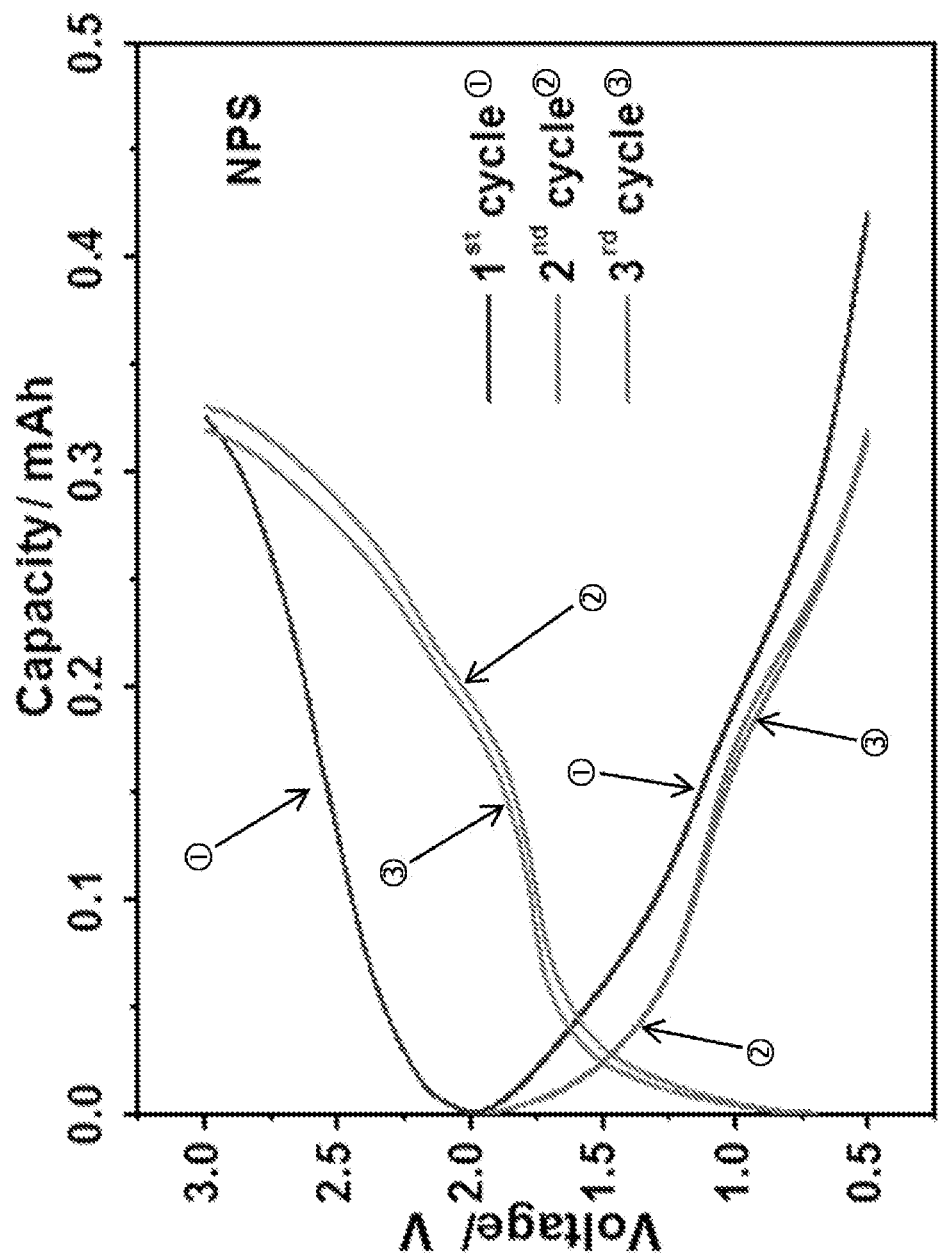
FIG. 31 is a line graph depicting the electrochemical performances of the $Na_2S$—$Na_3PS_4$-CMK-3 composite at 60° C. between 0.5 and 3 V. The upper axis shows the total capacity of the electrode.

The critical challenge for an ASSB is the large volume change (up to 74%) of $Na_2S$ during the S sodiation and desodiation, which dramatically damages the interface contact between $Na_2S$ and $Na_3PS_4$, and quickly deteriorates the electrochemical performance of the batteries. High performance of all solid-state Li—S batteries are normally achieved only under pressure to minimize the impact of volume change of sulfur. To evaluate the robustness of casting-annealing technology, the performance of ASSB without the application of pressure were analyzed. FIG. 28 presents the charge/discharge profiles of the ball milled $Na_2S$—$Na_3PS_4$-CMK-3 composite cathode. The ball milled $Na_2S$—$Na_3PS_4$-CMK-3 composite cathode delivered a discharge capacity of ~600 mAh/g in the first cycle, accompanied by a large over-potential and fast capacity decrease in the subsequent charge/discharge cycles. In contrast, the charge/discharge profiles of the cast-annealed $Na_2S$—$Na_3PS_4$-CMK-3 composite cathode (FIG. 29) provided a significantly higher reversible capacity (>800 mAh/g) with a significantly reduced over-potential to about ½ of the ball milled material (FIG. 28). One small plateau at about 0.6 V in the sodiation profile of the ball milled $Na_2S$—$Na_3PS_4$-CMK-3 and cast-annealed $Na_2S$—$Na_3PS_4$-CMK-3 composite cathodes is due to the reduction of P in the $Na_3PS_4$ solid electrolyte of $Na_2S$—$Na_3PS_4$-CMK-3 cathode. In Yue, J., *ACS Nano* 11:4885-4891 (2017) it was shown that certain reversible capacities can be achieved once the $Na_3PS_4$ solid electrolyte homogeneously mixed with the carbon black. In the cast-annealed composite, the electrolyte also provided about 25% of the total reversible capacities (FIGS. 30-31).

Figure 32:
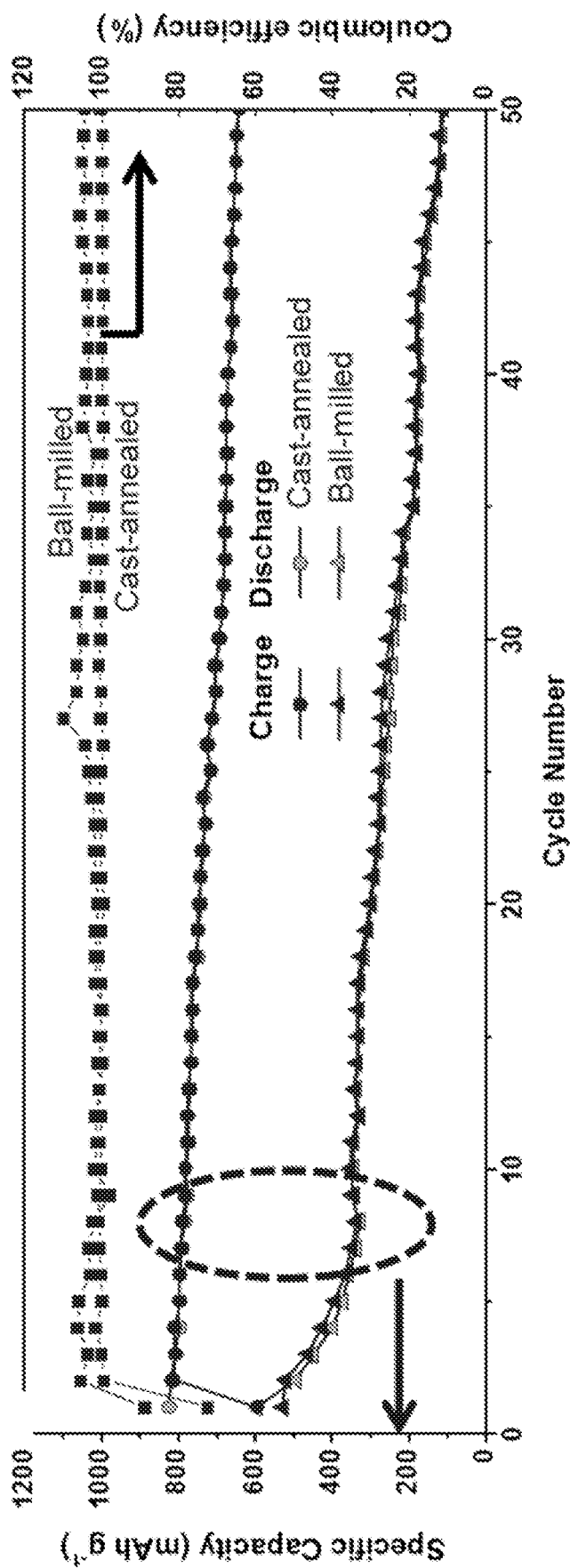
FIG. 32 is a line graph depicting the cycling properties of ball milled $Na_2S$—$Na_3PS_4$-CMK-3 composite and cast-annealed $Na_2S$—$Na_3PS_4$-CMK-3 composite cathodes at a current of 50 mA/g.

FIG. 32 compared the cycling properties of the cast-annealed $Na_2S$—$Na_3PS_4$-CMK-3 and the ball milled $Na_2S$—$Na_3PS_4$-CMK-3 composite cathodes at the same current density of 50 mA/g. The ball milled $Na_2S$—$Na_3PS_4$-CMK-3 composite cathode exhibited a reversible capacity of ~600 mAh/g for the initial cycle, but the capacity quickly dropped to 350 mAh/g after 10 cycles, and further decayed to only 110 mAh/g after less than 50 cycles. In sharp contrast, a much higher discharge capacity of >800 mAh/g was achieved for the cast-annealed $Na_2S$—$Na_3PS_4$-CMK-3 composite cathode in the first cycle. After 50 cycles, it still possessed a high reversible capacity of 650 mAh/g, which is about 6 times higher than that of the ball milled $Na_2S$—$Na_3PS_4$-CMK-3 composite cathode. The high reversible capacity of >650 mAh/g at the average discharge potential of 1.3 V provided an energy density of >800 Wh/kg. This value was even higher than that of the present high temperature (>300° C.) Na—S batteries (760 Wh/kg). The cast-annealed $Na_2S$—$Na_3PS_4$-CMK-3 composite cathodes also show a high Coulombic efficiency (~100%) without any shuttle reactions. Besides, the electrochemical performance of the ASSB using cast-annealed $Na_2S$—$Na_3PS_4$-CMK-3 composited cathodes was also much better than that of the Na—S batteries based on polymer or ether electrolytes, which only show low capacities of <400 mAh/g with limited cycling performance (<10 cycles). The significant capacity decay for the ball milled sample could be due to the dramatic increase of the interfacial resistance as confirmed by the continuous increase of the over-potential (FIG. 31).

Figure 33:
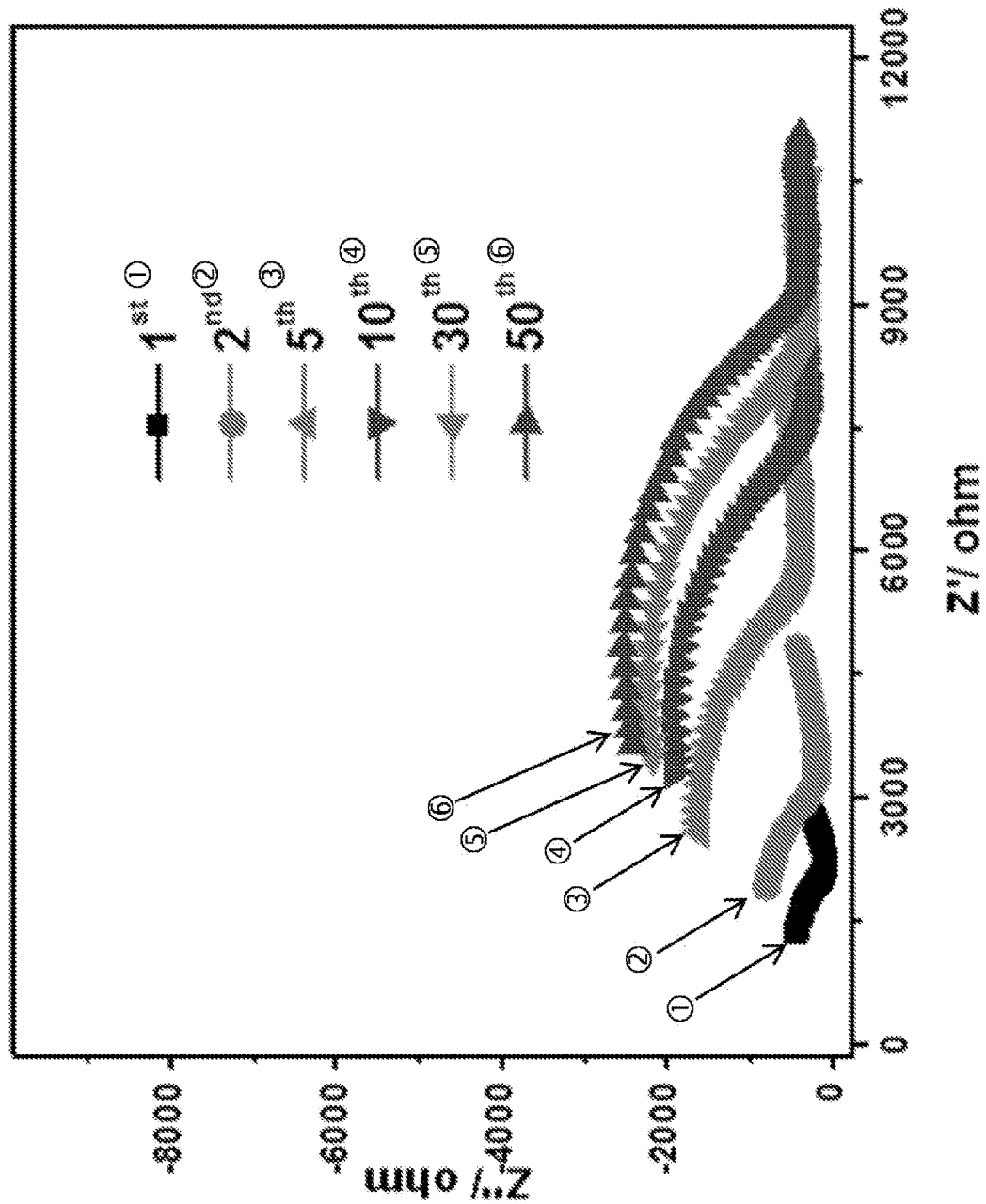
FIG. 33 is a graph depicting the impedance profile of the ASSB using ball milled $Na_2S$—$Na_3PS_4$-CMK-3 composite as cathode after different cycles.
Figure 34:
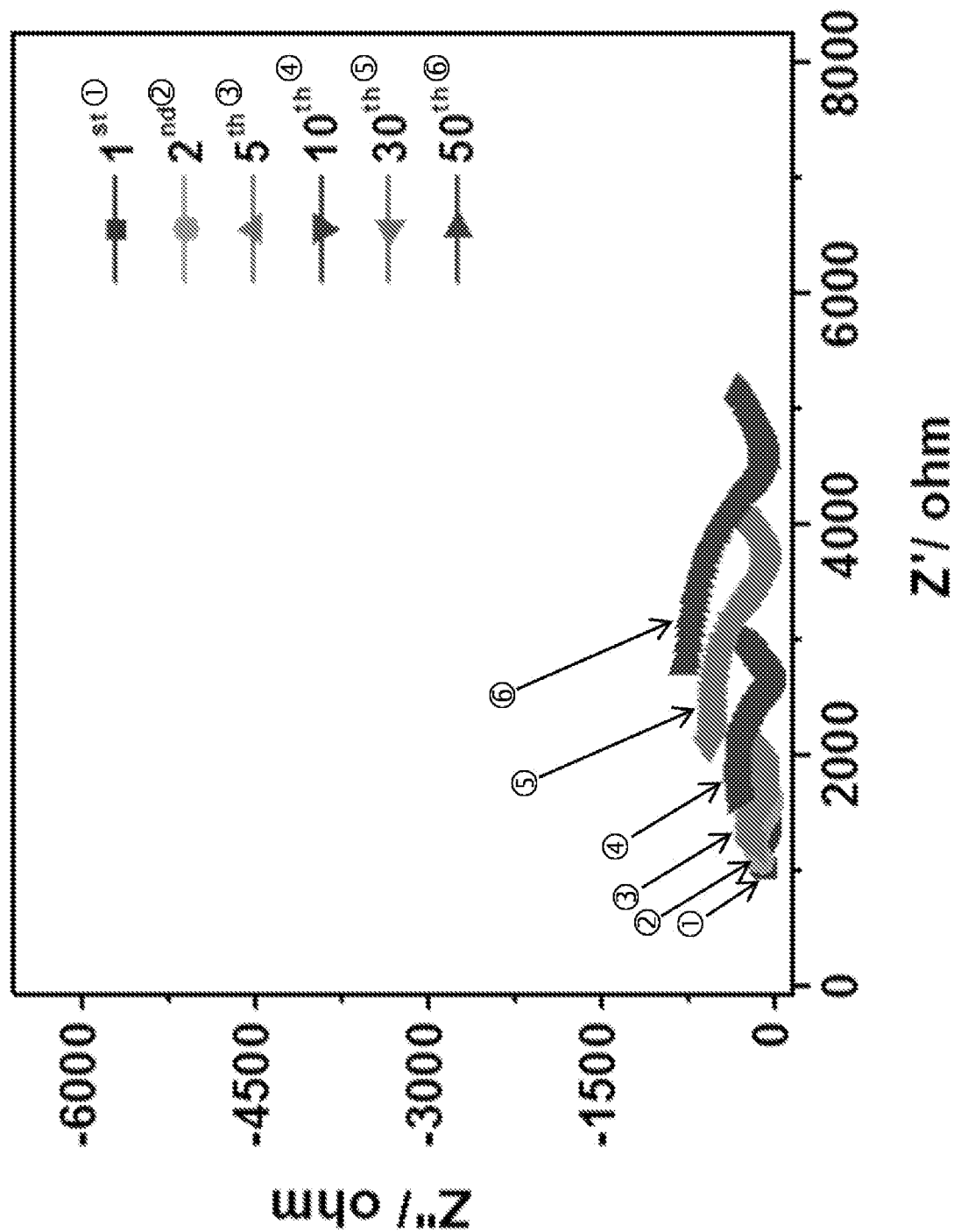
FIG. 34 is a graph depicting the impedance profile of the ASSB cast-annealed $Na_2S$—$Na_3PS_4$-CMK-3 cathode after different cycles.

The resistances of the ball milled $Na_2S$—$Na_3PS_4$-CMK-3 composite cathode and the cast-annealed $Na_2S$—$Na_3PS_4$-CMK-3 composite cathode at different charge/discharge cycles were measured using electrochemical impedance spectroscopy (EIS). FIG. 33 shows the EIS for the ball milled $Na_2S$—$Na_3PS_4$-CMK-3 composite cathode and FIG. 34 shows the EIS for the cast-annealed $Na_2S$—$Na_3PS_4$-CMK-3 composite cathode at the fully discharged state at 1st, 2nd, 5th, 10th, 30th, and 50th cycles. The semicircles in the EIS Nyquist plots represent the interfacial resistances, whereas the low-frequency slope line is ascribed to the sodium ion diffusion inside the cathodes. The cast-annealed $Na_2S$—$Na_3PS_4$-CMK-3 composite cathode exhibited a much lower interfacial resistance than that of the ball milled $Na_2S$—$Na_3PS_4$-CMK-3 composite cathode. The dramatically decreased interfacial resistance between the active species of the electrolyte benefits from the intimate contacts among $Na_2S$, $Na_3PS_4$ solid electrolyte, and the CMK-3 electron conducting agent. Although the interface resistances of both cathodes increased due to large volume change of $Na_2S$ and lack of pressure to recover the volumetric change during repeated sodiation/desodiation reactions, the amount of resistance increase of the cast-annealed ball milled $Na_2S$—$Na_3PS_4$-CMK-3 composite cathode (FIG. 33) was much smaller than that of the ball milled $Na_2S$—$Na_3PS_4$-CMK-3 composite cathode (FIG. 34), demonstrating the high robustness of the cast-annealed materials. Moreover, a high Coulombic efficiency of ~100% was obtained after the second cycles for the cast-annealed ball milled $Na_2S$—$Na_3PS_4$-CMK-3 composite cathode, implying the excellent reversibility of the sodiation/desodiation process and the total suppression of the polysulfide shuttle reactions. The polysulfide shuttle has proven to be a key challenge for room-temperature liquid electrolyte Na—S batteries.

Figure 35:
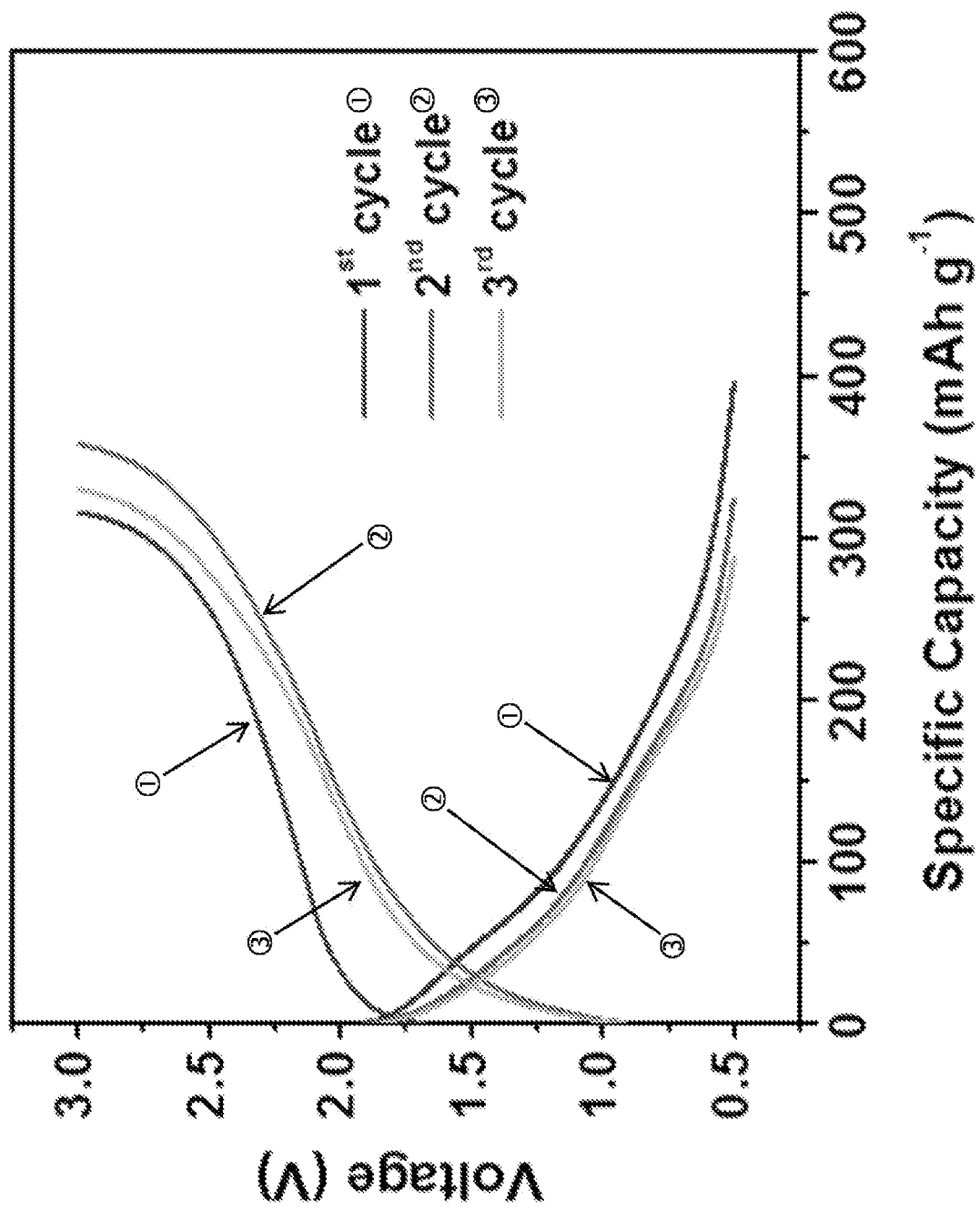
FIG. 35 is a line graph depicting the electrochemical performances of the ball milled $Na_2S$—$Na_3PS_4$-CMK-3 composite cathode in ASSB tested at room temperature between 0.5 and 3 V. First three charge-discharge curves of ball milled $Na_2S$—$Na_3PS_4$-CMK-3 composite at 50 mA/g.
Figure 36:
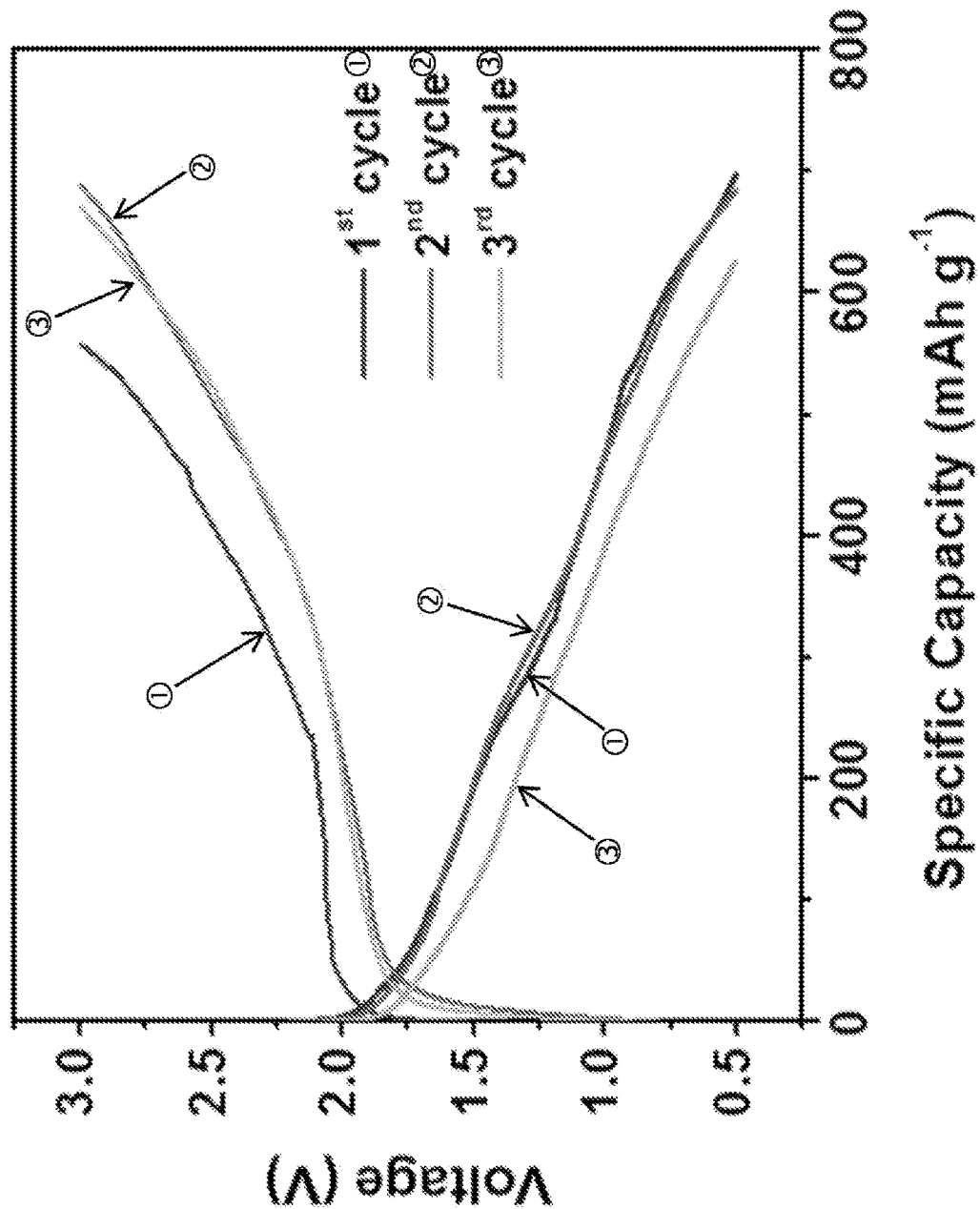
FIG. 36 is a line graph depicting the electrochemical performances of the cast-annealed $Na_2S$—$Na_3PS_4$-CMK-3 composite cathodes in ASSB tested at room temperature between 0.5 and 3 V. First three charge-discharge curves of cast-annealed $Na_2S$—$Na_3PS_4$-CMK-3 composite cathodes at 50 mA/g.
Figure 37:
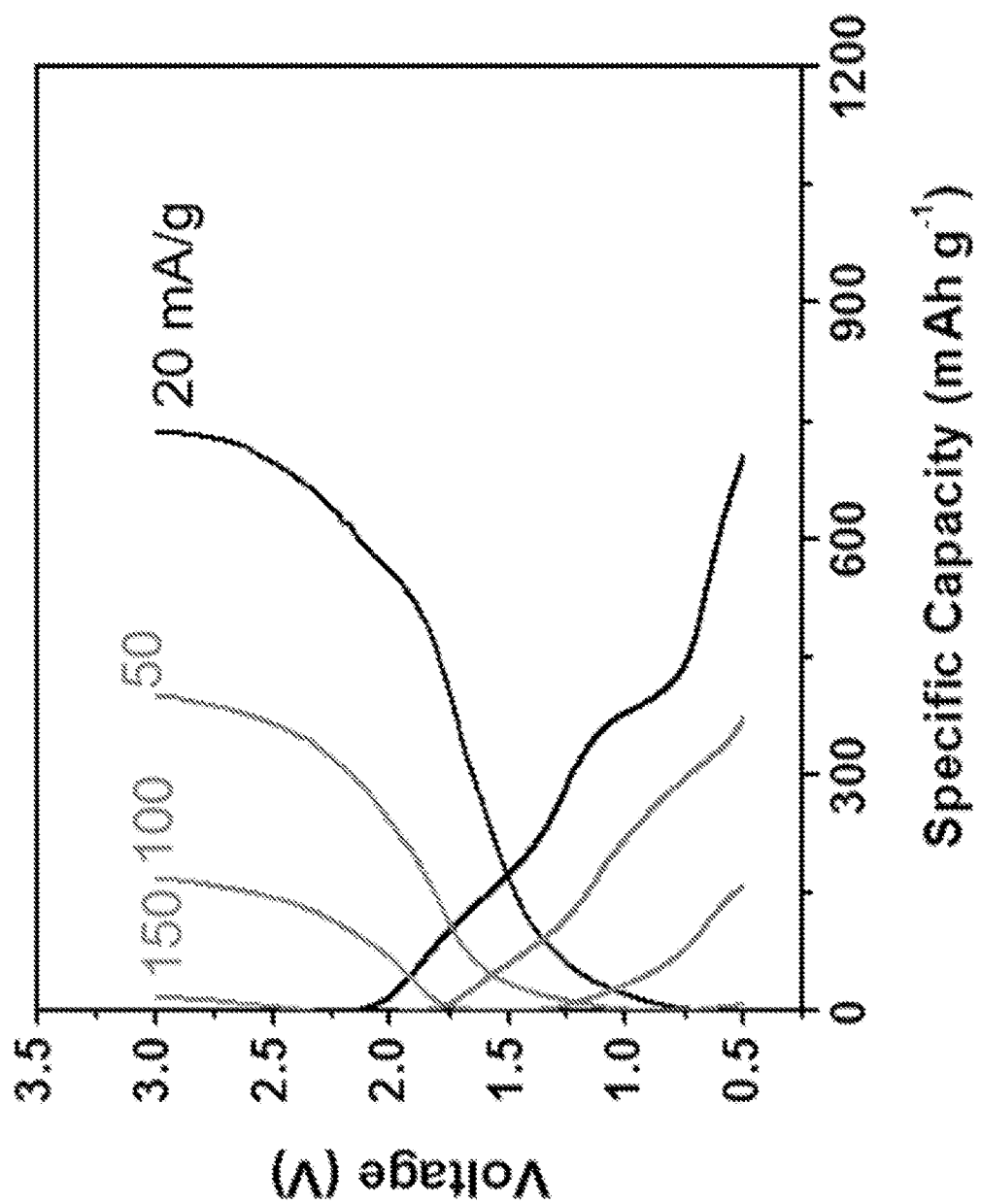
FIG. 37 is a line graph depicting charge-discharge profiles of the ball milled $Na_2S$—$Na_3PS_4$-CMK-3 composite cathode in the ASSB at 60° C. between 0.5 and 3 V at different current densities from 20 mA/g to 150 mA/g. The cells were pre-cycled for 3 cycles at each current density, and the second charge-discharge profiles were provided.
Figure 38:
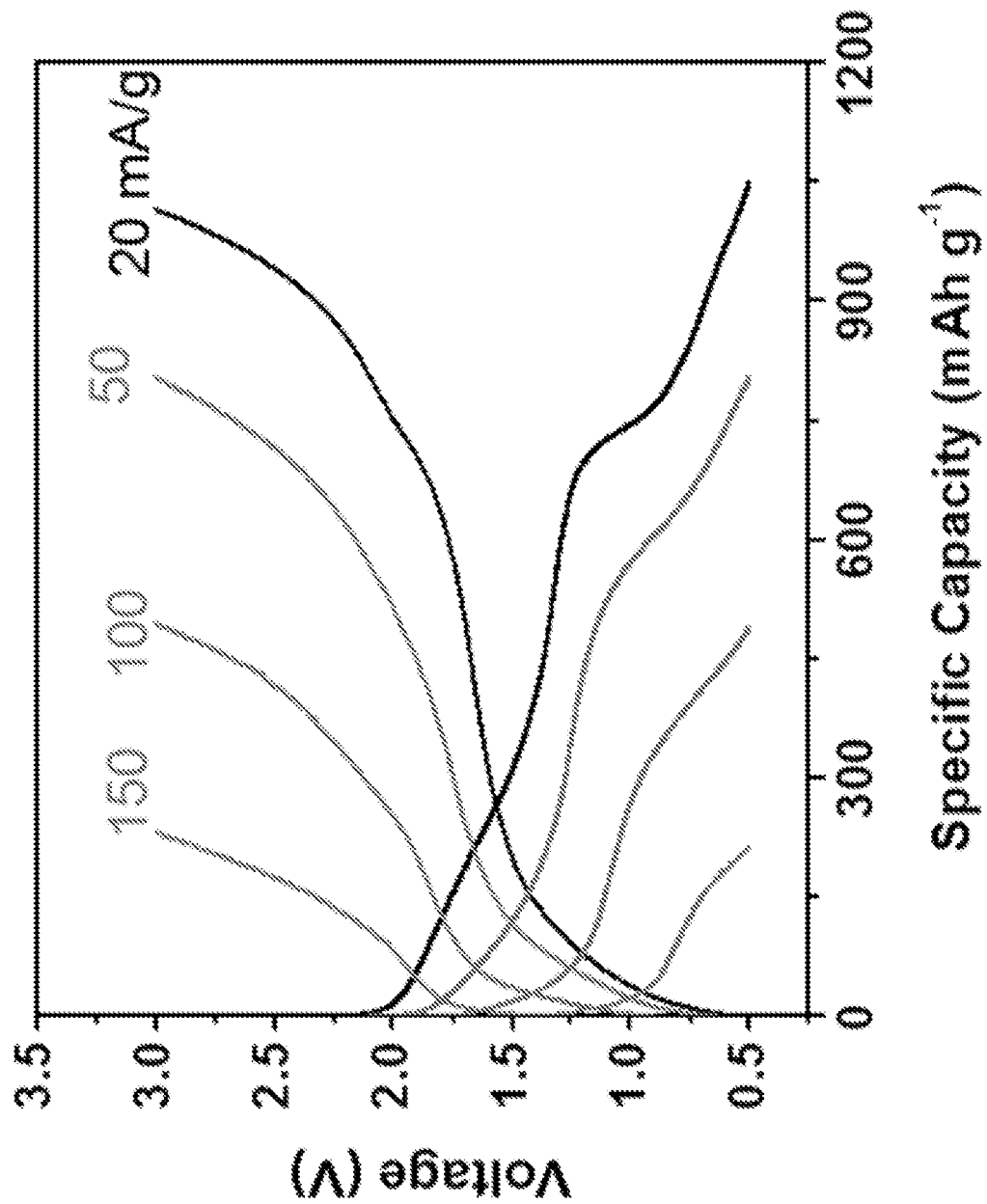
FIG. 38 is a line graph depicting charge-discharge profiles of the cast-annealed $Na_2S$—$Na_3PS_4$-CMK-3 composite cathode in the ASSB at 60° C. between 0.5 and 3 V at different current densities from 20 mA/g to 150 mA/g. The cells were pre-cycled for 3 cycles at each current density, and the second charge-discharge profiles were provided.
Figure 39:
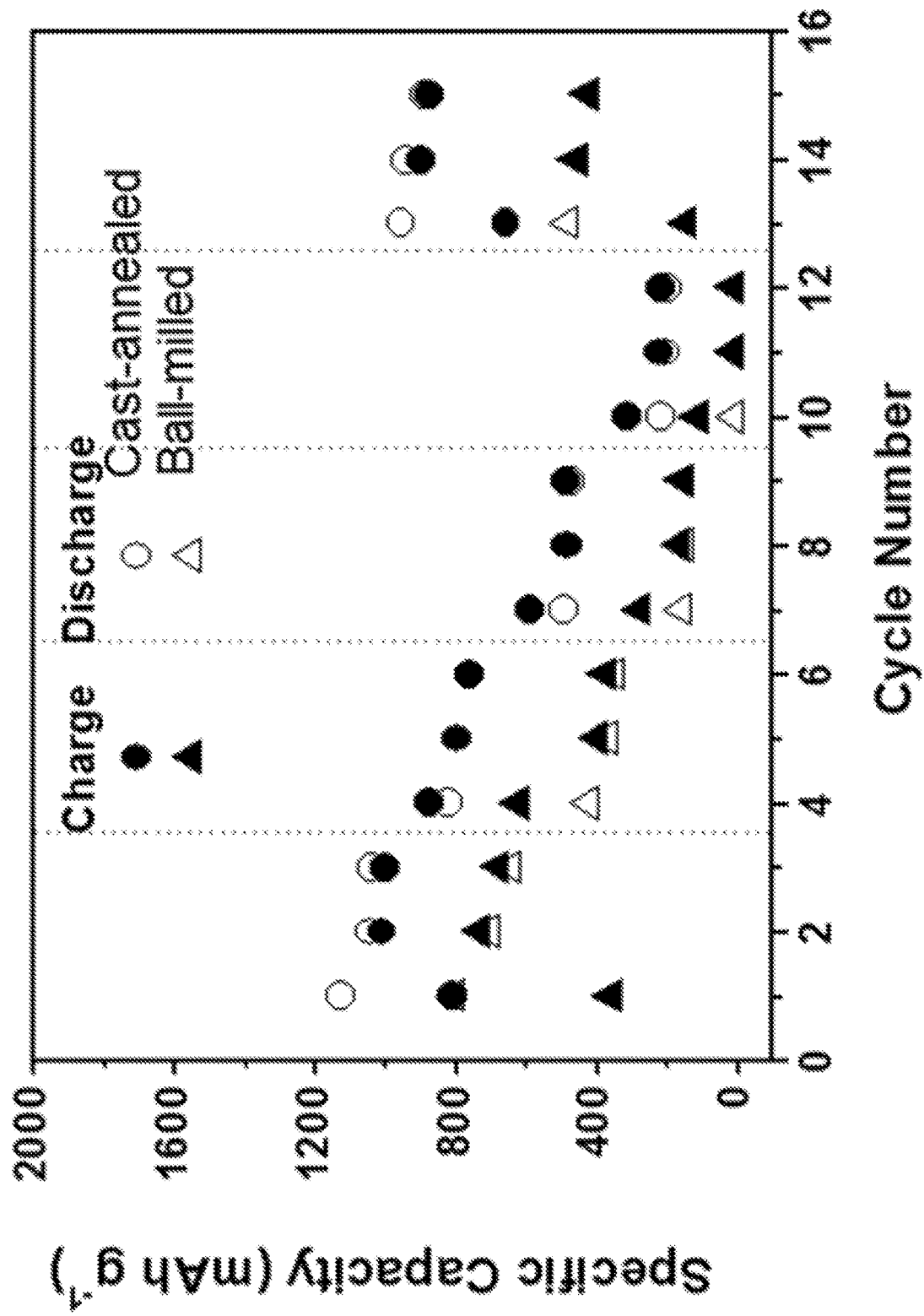
FIG. 39 is a scatter plot depicting rate performance of ball milled $Na_2S$—$Na_3PS_4$-CMK-3 composite and cast-annealed $Na_2S$—$Na_3PS_4$-CMK-3 composite cathodes in the ASSB at 60° C. between 0.5 and 3 V.
Figure 40:
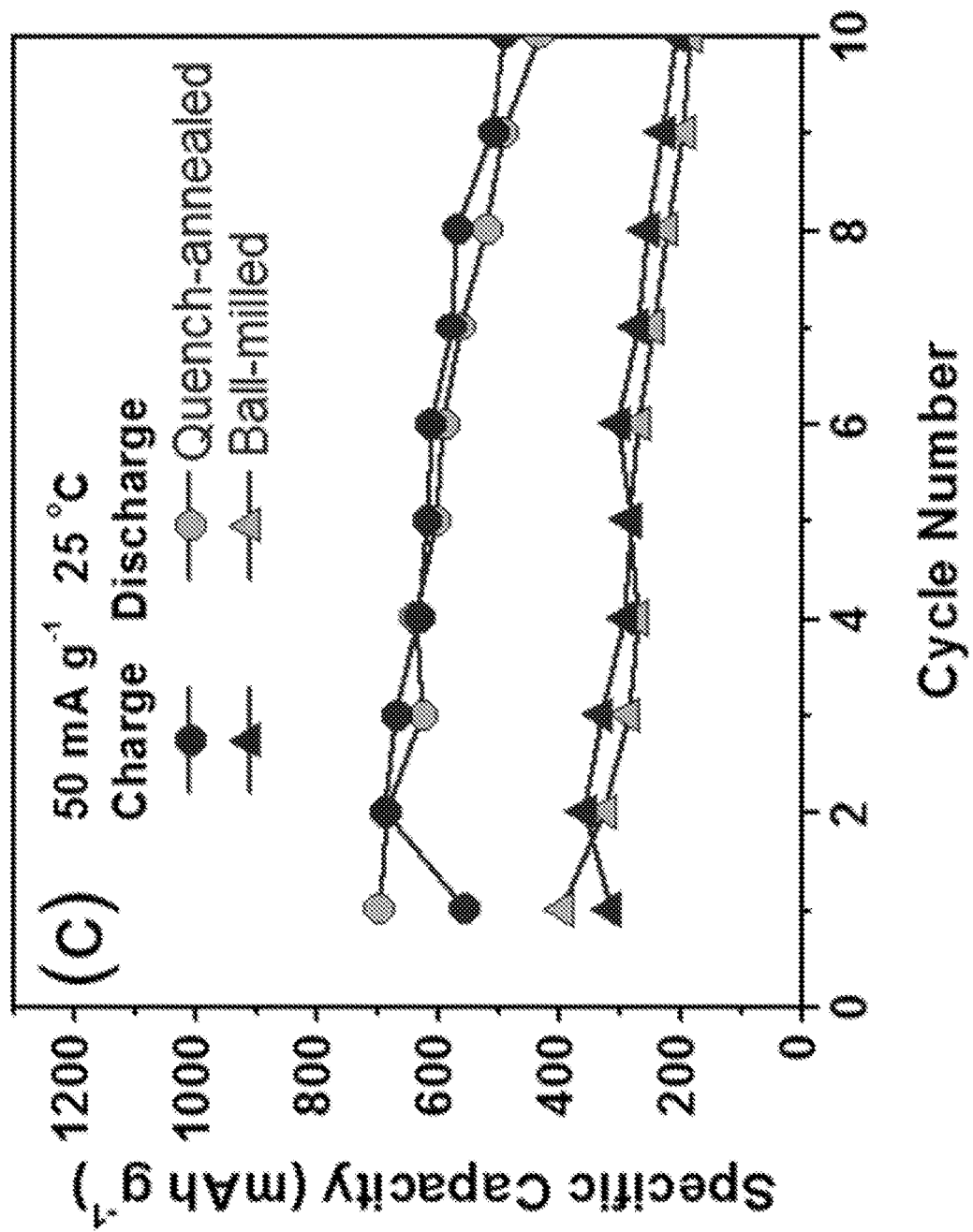
FIG. 40 is a line graph depicting cycling performance of ball milled $Na_2S$—$Na_3PS_4$-CMK-3 composite and cast-annealed $Na_2S$—$Na_3PS_4$-CMK-3 composite cathodes at a current of 50 mA/g.
Figure 41:
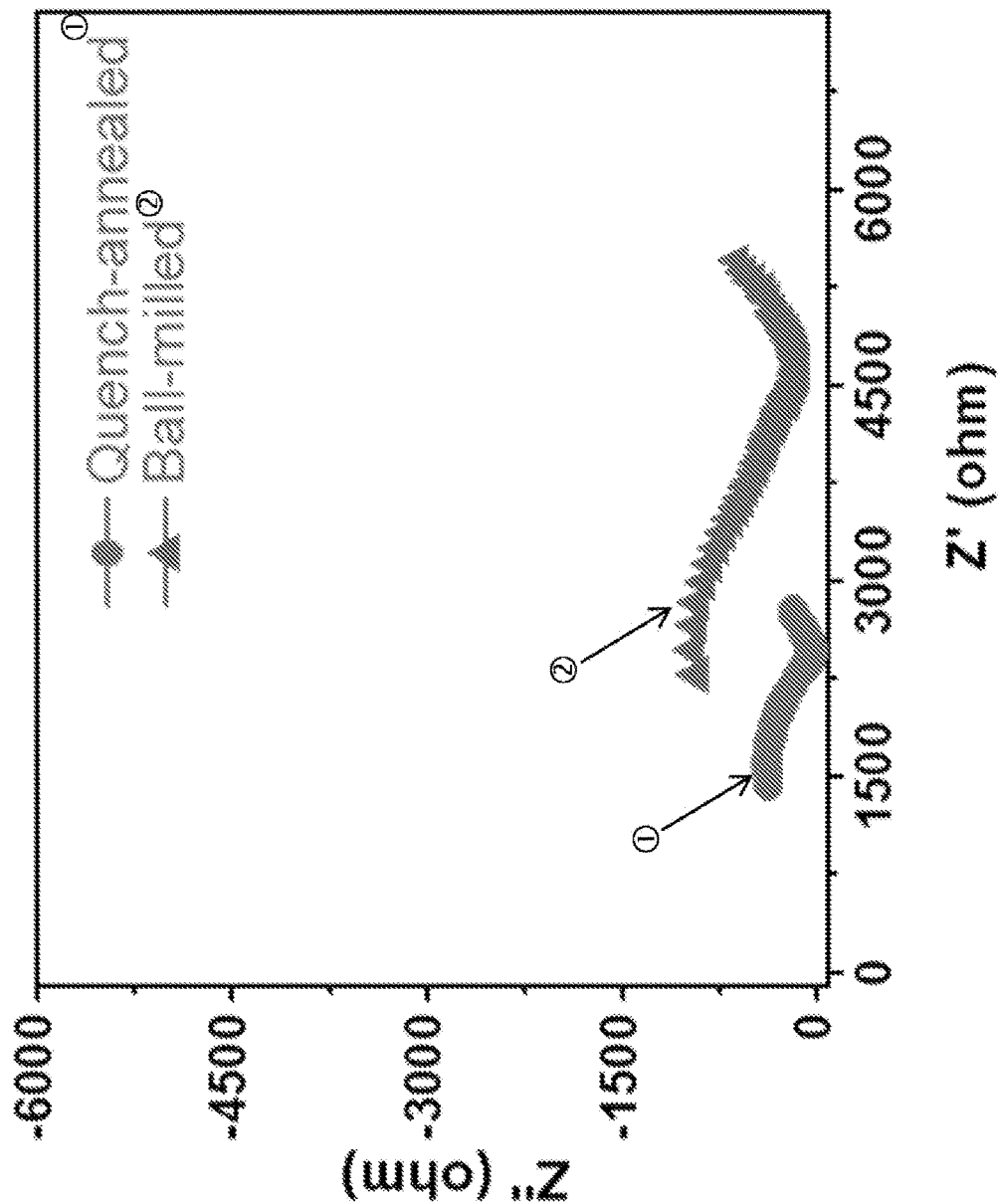
FIG. 41 is a line graph depicting impedance profiles of the ASSBs using ball milled $Na_2S$—$Na_3PS_4$-CMK-3 composite cathodes and cast-annealed $Na_2S$—$Na_3PS_4$-CMK-3 composite cathodes. Electrochemical impedance spectroscopy (EIS) was measured at the fully discharged state of the batteries after 3 cycles.
Figure 42:
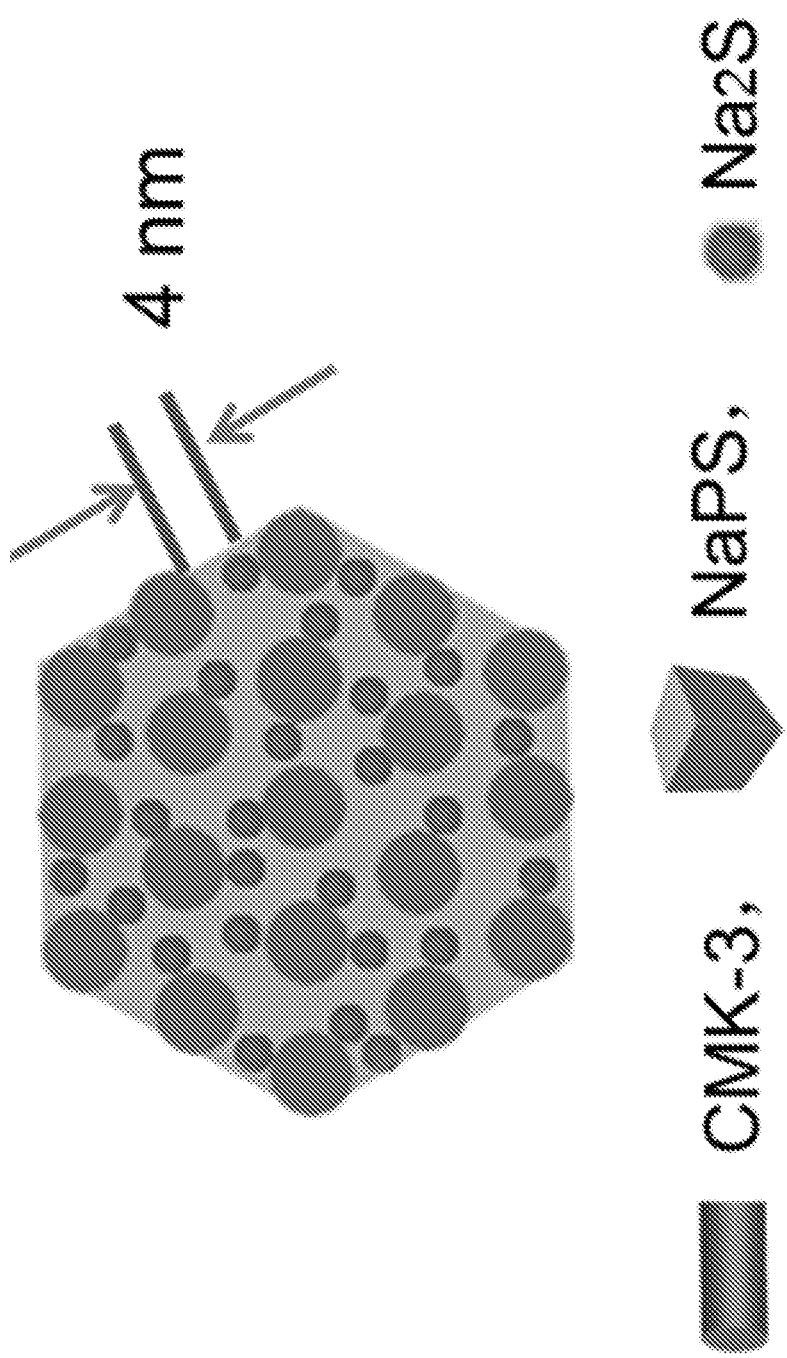
FIG. 42 is a schematic depicting the front-view of a single rod of the cast-annealed $Na_2S$—$Na_3PS_4$-CMK-3 composite.
Figure 43:
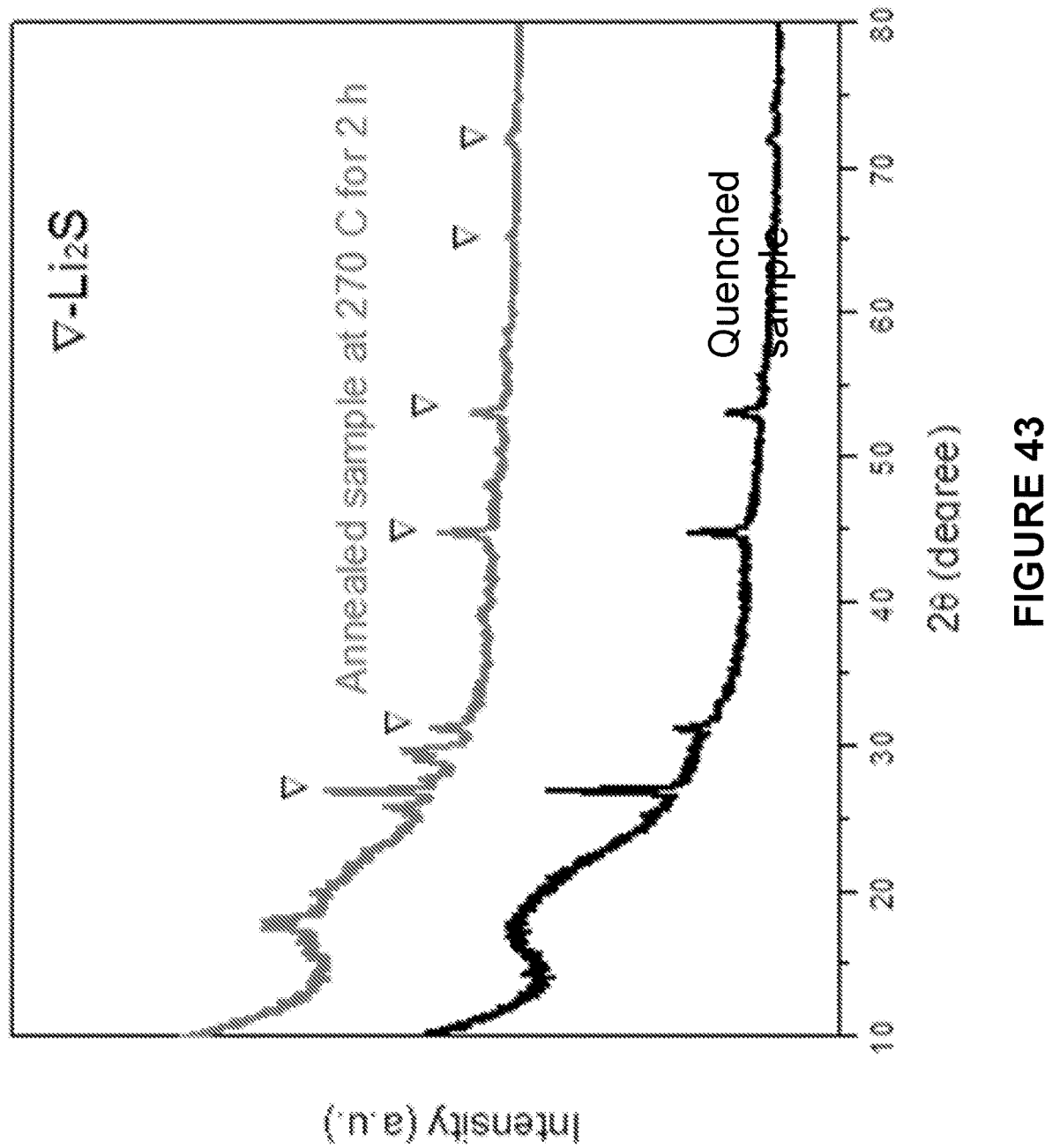
FIG. 43 is a line graph depicting XRD patterns for an annealed and quenched $Li_2S$—$Li_3PS_4$-CMK-3 composite.

The ball milled $Na_2S$—$Na_3PS_4$-CMK-3 composite cathode (FIG. 35) also exhibited a significantly improved kinetics with a much lower voltage hysteresis than that of the cast-annealed $Na_2S$—$Na_3PS_4$-CMK-3 composite cathode at room temperature (FIG. 36). The rate capabilities of the ball milled $Na_2S$—$Na_3PS_4$-CMK-3 composite cathode and the cast-annealed $Na_2S$—$Na_3PS_4$-CMK-3 composite cathode were also tested at 60° C. by enlarging the current density from 20 to 150 mA/g. The sodiation/desodiation profiles of ball milled $Na_2S$—$Na_3PS_4$-CMK-3 composite cathode and cast-annealed $Na_2S$—$Na_3PS_4$-CMK-3 composite cathode at different current densities are shown in FIG. 37 and FIG. 38, respectively, and FIG. 39 and FIG. 40 show their rate capacities. For the ball milled $Na_2S$—$Na_3PS_4$-CMK-3 composite cathode, only a reversible capacity of ~150 mAh/g was achieved at a current of 100 mA/g. As the current density is raised to 150 mA/g, the reversible capacity dramatically decays to less than 10 mAh/g. However, for the cast-annealed $Na_2S$—$Na_3PS_4$-CMK-3 composite cathode, high capacities of 1050, 750, 500, and 200 mAh/g were achieved at a charge-discharge current of 20, 50, 100, and 150 mA/g, respectively. Moreover, once the current density finally decreased back to 20 mA/g, the capacity returned to ~900 mAh/g, indicating the good tolerance for the volume change for the cast-annealed $Na_2S$—$Na_3PS_4$-CMK-3 composite cathode during the rapid sodiation/desodiation reactions.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All publications, patents, and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A method of preparing a composite cathode comprising:
   (a) admixing $X_2S$, $P_2S_5$, and an ordered mesoporous carbon, wherein X is $Na^+$ or $Li^+$;
   (b) raising the temperature of the admixture to between about 600° C. and about 1000° C.;
   (c) lowering the temperature of the admixture in (b); and
   (d) raising the temperature of the admixture in (c) to between about 100° C. and about 400° C.

2. The method of claim 1, further comprising:
   (e) lowering the temperature of the admixture in (d).

3. The method of claim 1, wherein the admixture in (a) is milled.

4. The method of claim 1, wherein the weight ratio of $X_2S$ to $P_2S_5$ is between about 4:1 to about 2:1.

5. The method of claim 1, wherein the weight ratio of $X_2S$ to ordered mesoporous carbon is between about 3:1 to about 1:1.

6. The method of claim 1, wherein the ordered mesoporous carbon is CMK-3.

7. The method of claim 1, wherein the temperature in (b) is raised to between about 800° C. and about 900° C.

8. The method of claim 1, wherein the temperature in (d) is raised to between about 200° C. and about 300° C.

9. A composite cathode prepared by the method of claim 1.

* * * * *